(12) United States Patent
Ma et al.

(10) Patent No.: US 11,429,577 B2
(45) Date of Patent: Aug. 30, 2022

(54) PERFORMANCE SIMULATION AND COST-BENEFIT ANALYSIS FOR PERFORMANCE FACTORS FOR WEB PRODUCTS IN DATABASE SYSTEMS

(71) Applicant: salesforce.com, inc., San Francisco, CA (US)

(72) Inventors: Billy Ma, San Mateo, CA (US); Jiten Oswal, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 272 days.

(21) Appl. No.: 16/773,943

(22) Filed: Jan. 27, 2020

(65) Prior Publication Data
US 2021/0232552 A1 Jul. 29, 2021

(51) Int. Cl.
G06F 16/21 (2019.01)
G06F 17/18 (2006.01)
G06F 16/953 (2019.01)
G06F 16/28 (2019.01)
H04L 67/10 (2022.01)
(Continued)

(52) U.S. Cl.
CPC ........ *G06F 16/217* (2019.01); *G06F 3/04847* (2013.01); *G06F 16/25* (2019.01); *G06F 16/283* (2019.01); *G06F 16/953* (2019.01); *G06F 17/18* (2013.01); *G06Q 10/06375* (2013.01); *G06Q 10/06395* (2013.01); *H04L 67/10* (2013.01)

(58) Field of Classification Search
CPC ...... G06F 16/217; G06F 16/953; G06F 16/25; G06F 16/283
See application file for complete search history.

(56) References Cited

U.S. PATENT DOCUMENTS 5,577,188 A 11/1996 Zhu
5,608,872 A 3/1997 Schwartz et al.
(Continued)

OTHER PUBLICATIONS

U.S. Appl. No. 16/773,919, filed Jan. 27, 2020, Billy Ma.
(Continued)

*Primary Examiner* — Baoquoc N To
(74) *Attorney, Agent, or Firm* — Kwan & Olynick LLP

(57) ABSTRACT

In accordance with embodiments, there are provided mechanisms and methods for facilitating performance simulation and cost-benefit analysis for performance factors for web products in database systems according to one embodiment. In one embodiment and by way of example, a method includes analyzing statistics associated with performance of delivery of contents associated with a web product, where the contents are delivered using one or more delivery platforms and one or more device types over one or more networks, and computing costs and benefits of adjusting one or more performance factors to enhance performance of the web product based on one or more metrics associated with the delivery platforms and the one or more device types. The method may further include assigning one or more cost-benefit ratings, based on the costs and the benefits, to the one or more performance factors to indicate a cost and a benefit of adjusting each of the one or more performance factors, and facilitating, based on the one or more cost-benefit ratings, adjustments to one or more virtual setting buttons to facilitate one or more modifications to the one or more parameters.

18 Claims, 14 Drawing Sheets

(51) Int. Cl.
  *G06Q 10/06* (2012.01)
  *G06F 3/04847* (2022.01)
  *G06F 16/25* (2019.01)

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,201,736 B2 * | 6/2012 | Doglioni Majer ...... G07F 9/009 235/383 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2010/0083375 A1 * | 4/2010 | Friedman .............. G06F 16/217 726/22 |
| 2012/0226977 A1 | 9/2012 | Lengeling et al. |
| 2012/0246310 A1 | 9/2012 | Broda et al. |
| 2013/0097313 A1 | 4/2013 | Zhang et al. |
| 2015/0224845 A1 * | 8/2015 | Anderson .............. B60G 13/14 701/37 |
| 2015/0286396 A1 | 10/2015 | Zeng |
| 2018/0157778 A1 | 6/2018 | Mac et al. |
| 2018/0227211 A1 | 8/2018 | Vijayanathan et al. |
| 2018/0349466 A1 | 12/2018 | Dadkhani et al. |
| 2019/0304322 A1 | 10/2019 | Delisle et al. |
| 2019/0318050 A1 | 10/2019 | Zapolsky et al. |
| 2020/0099773 A1 | 3/2020 | Myers et al. |

OTHER PUBLICATIONS

U.S. Appl. No. 16/773,933, filed Jan. 27, 2020, Billy Ma.
U.S. Appl. No. 16/773,946, filed Jan. 27, 2020, Billy Ma.
Non-Final Office Action for U.S. Appl. No. 16/773,919 dated Mar. 15, 2021, 13 pages.
Non-Final Office Action for U.S. Appl. No. 16/773,946 dated Jan. 28, 2021, 18 pages.

(56) References Cited

OTHER PUBLICATIONS

U.S. Appl. No. 16/773,919, filed Jan. 27, 2020.
U.S. Appl. No. 16/773,933, filed Jan. 27, 2020.
U.S. Appl. No. 16/773,946, filed Jan. 27, 2020.

* cited by examiner

PERFORMANCE SIMULATION AND COST-BENEFIT ANALYSIS FOR PERFORMANCE FACTORS FOR WEB PRODUCTS IN DATABASE SYSTEMS

RELATED APPLICATIONS

This application relates to commonly assigned and concurrently filed U.S. patent application, entitled DYNAMIC ADJUSTMENT OF WEB PRODUCT-BASED PERFORMANCE FACTORS IN DATABASE SYSTEMS, by Billy Ma and Jiten Oswal, filed Jan. 24, 2020, PERFORMANCE SIMULATION FOR SELECTED PLATFORMS FOR WEB PRODUCTS IN DATABASE SYSTEMS, by Billy Ma and Jiten Oswal, Jan. 24, 2020, and ACTIONABLE INSIGHTS FOR PERFORMANCE OF WEB PRODUCTS IN DATABASE SYSTEMS, by Bill Ma and Jiten Oswal, filed Jan. 24, 2020.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management; more specifically, to facilitate performance simulation and cost-benefit analysis for performance factors for web products in database systems.

BACKGROUND

Conventional techniques do not provide for automatic or intelligent ways for performance analysis of web products. Such conventional techniques provide for web performance analysis to be performed as the last stage in a web development process and therefore such analysis lack much value or significance.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

SUMMARY

Figure 1:
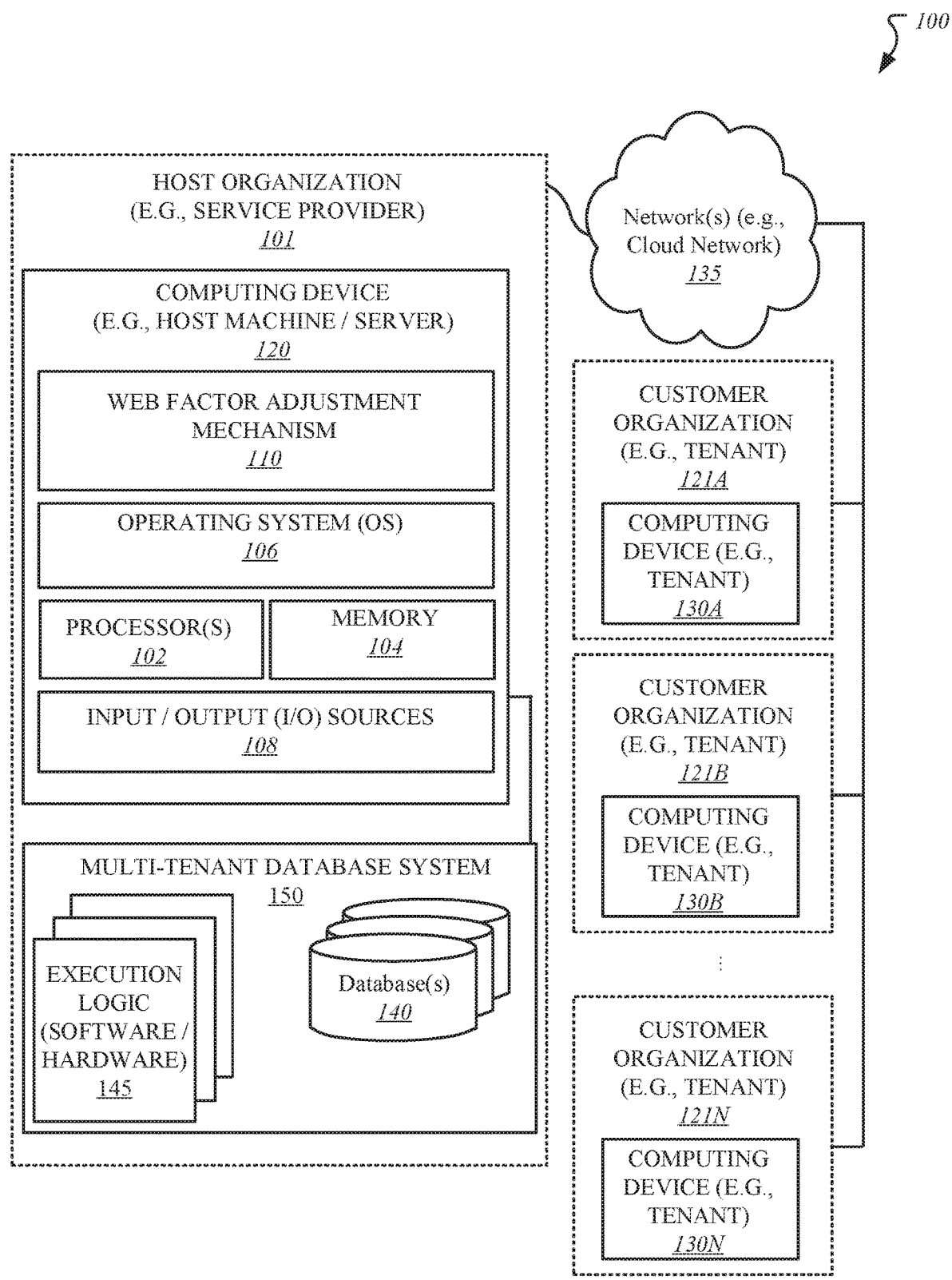
FIG. 1 illustrates a system having a computing device employing a web factor adjustment mechanism according to one embodiment.

In accordance with embodiments, there are provided mechanisms and methods for facilitating performance simulation and cost-benefit analysis for performance factors for web products in database systems according to one embodiment. In one embodiment and by way of example, a method includes analyzing statistics associated with performance of delivery of contents associated with a web product, where the contents are delivered using one or more delivery platforms and one or more device types over one or more networks, and computing costs and benefits of adjusting one or more performance factors to enhance performance of the web product based on one or more metrics associated with the delivery platforms and the one or more device types. The method may further include assigning one or more cost-benefit ratings, based on the costs and the benefits, to the one or more performance factors to indicate a cost and a benefit of adjusting each of the one or more performance factors, and facilitating, based on the one or more cost-benefit ratings, adjustments to one or more virtual setting buttons to facilitate one or more modifications to the one or more parameters.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Embodiments provide for a novel technique for simulating performance factors associated with web products, such as websites, for offering automated and dynamic web performance analysis of the web products.

Embodiments provide for a novel technique for predicting which actions to take, such as a which performance factors to adjust, based on metadata and one or more structures or platforms.

Embodiments provide for a novel technique for evaluating historical statistics associated with performance factors associated with web products. Embodiments further provide for rating the performance factors based on the historical statistics and assigning cost-benefit elements to the performance factors for adjustments through virtual toggles.

Embodiments provide for a novel technique for automatically and dynamically running simulation of adjustments to performance factors to enhance performance of web products. Embodiments further provide for recommending certain adjustments at certain levels to certain performance factors to enhance the web product performance.

It is contemplated that embodiments and their implementations are not merely limited to multi-tenant database system ("MTDBS") and can be used in other environments, such as a client-server system, a mobile device, a personal computer ("PC"), a web services environment, etc. However, for the sake of brevity and clarity, throughout this document, embodiments are described with respect to a multi-tenant database system, such as Salesforce.com®, which is to be regarded as an example of an on-demand services environment. Other on-demand services environments include Salesforce® Exact Target Marketing Cloud™.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

In one embodiment, a multi-tenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a system 100 having a computing device 120 employing a web factor adjustment mechanism 110 according to one embodiment. In one embodiment, web factor adjustment mechanism 110 provides for a novel technique for facilitating dynamic adjustment of web product-based factors for efficiency in database systems.

As illustrated, in one embodiment, computing device 120, being part of host organization 101 (e.g., service provider, such as Salesforce.com®), represents or includes a server computer acting as a host machine for web factor adjustment mechanism 110 for facilitating creating and using an intelligent data-loader for facilitating efficient bulk loading/inserting of data records in a multi-tiered, multi-tenant, on-demand services environment.

It is to be noted that terms like "queue message", "job", "query", "request" or simply "message" may be referenced interchangeably and similarly, terms like "job types", "message types", "query type", and "request type" may be referenced interchangeably throughout this document. It is to be further noted that messages may be associated with one or more message types, which may relate to or be associated with one or more customer organizations, such as customer organizations 121A-121N, where, as aforementioned, throughout this document, "customer organizations" may be referred to as "tenants", "customers", or simply "organizations". An organization, for example, may include or refer to (without limitation) a business (e.g., small business, big business, etc.), a company, a corporation, a non-profit entity, an institution (e.g., educational institution), an agency (e.g., government agency), etc.), etc., serving as a customer or client of host organization 101 (also referred to as "service provider" or simply "host"), such as Salesforce.com®, serving as a host of web factor adjustment mechanism 110.

Similarly, the term "user" may refer to a system user, such as (without limitation) a software/application developer, a system administrator, a database administrator, an information technology professional, a program manager, product manager, etc. The term "user" may further refer to an end-user, such as (without limitations) one or more of tenants or customer organizations 121A-N and/or their representatives (e.g., individuals or groups working on behalf of one or more of customer organizations 121A-N), such as a salesperson, a sales manager, a product manager, an accountant, a director, an owner, a president, a system administrator, a computer programmer, an information technology ("IT") representative, etc.

Computing device 120 may include (without limitations) server computers (e.g., cloud server computers, etc.), desktop computers, cluster-based computers, set-top boxes (e.g., Internet-based cable television set-top boxes, etc.), etc. Computing device 120 includes an operating system ("OS") 106 serving as an interface between one or more hardware/physical resources of computing device 120 and one or more client devices 130A-130N, etc. Computing device 120 further includes processor(s) 102, memory 104, input/output ("I/O") sources 108, such as touchscreens, touch panels, touch pads, virtual or regular keyboards, virtual or regular mice, etc.

In one embodiment, host organization 101 may employ a production environment that is communicably interfaced with client devices 130A-N through host organization 101. Client devices 130A-N may include (without limitation) customer organization-based server computers, desktop computers, laptop computers, mobile computing devices, such as smartphones, tablet computers, personal digital assistants, e-readers, media Internet devices, smart televisions, television platforms, wearable devices (e.g., glasses, watches, bracelets, smartcards, jewelry, clothing items, etc.), media players, global positioning system-based navigation systems, cable setup boxes, etc. In some embodiments, client devices 130A-include artificially intelligent devices, such as autonomous machines including (without limitations) one or more of autonomous vehicles, drones, robots, smart household appliances, smart equipment, etc.

In one embodiment, the illustrated multi-tenant database system 150 includes database(s) 140 to store (without limitation) information, relational tables, datasets, and underlying database records having tenant and user data therein on behalf of customer organizations 121A-N (e.g., tenants of multi-tenant database system 150 or their affiliated users). In alternative embodiments, a client-server computing architecture may be utilized in place of multi-tenant database system 150, or alternatively, a computing grid, or a pool of work servers, or some combination of hosted computing architectures may be utilized to carry out the computational workload and processing that is expected of host organization 101.

The illustrated multi-tenant database system 150 is shown to include one or more of underlying hardware, software, and logic elements 145 that implement, for example, database functionality and a code execution environment within host organization 101. In accordance with one embodiment, multi-tenant database system 150 further implements databases 140 to service database queries and other data interactions with the databases 140. In one embodiment, hardware, software, and logic elements 145 of multi-tenant database system 130 and its other elements, such as a distributed file store, a query interface, etc., may be separate and distinct from customer organizations (121A-121N) which utilize the services provided by host organization 101 by communicably interfacing with host organization 101 via network(s) 135 (e.g., cloud network, the Internet, etc.). In such a way, host organization 101 may implement on-demand services, on-demand database services, cloud computing services, etc., to subscribing customer organizations 121A-121N.

In some embodiments, host organization 101 receives input and other requests from a plurality of customer organizations 121A-N over one or more networks 135; for example, incoming search queries, database queries, application programming interface ("API") requests, interactions with displayed graphical user interfaces and displays at client devices 130A-N, or other inputs may be received from customer organizations 121A-N to be processed against multi-tenant database system 150 as queries via a query interface and stored at a distributed file store, pursuant to which results are then returned to an originator or requestor, such as a user of client devices 130A-N at any of customer organizations 121A-N.

As aforementioned, in one embodiment, each customer organization 121A-N is an entity selected from a group consisting of a separate and distinct remote organization, an organizational group within host organization 101, a business partner of host organization 101, a customer organization 121A-N that subscribes to cloud computing services provided by host organization 101, etc.

In one embodiment, requests are received at, or submitted to, a web server within host organization 101. Host organization 101 may receive a variety of requests for processing by host organization 101 and its multi-tenant database system 150. For example, incoming requests received at the web server may specify which services from host organization 101 are to be provided, such as query requests, search request, status requests, database transactions, graphical user interface requests and interactions, processing requests to retrieve, update, or store data on behalf of one of customer organizations 121A-N, code execution requests, and so forth. Further, the web-server at host organization 101 may be responsible for receiving requests from various customer organizations 121A-N via network(s) 135 on behalf of the query interface and for providing a web-based interface or other graphical displays to one or more end-user client devices 130A-N or machines originating such data requests.

Further, host organization 101 may implement a request interface via the web server or as a stand-alone interface to receive requests packets or other requests from the client devices 130A-N. The request interface may further support the return of response packets or other replies and responses in an outgoing direction from host organization 101 to one or more client devices 130A-N.

It is to be noted that any references to software codes, data and/or metadata (e.g., Customer Relationship Management ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request", and "message" may be used interchangeably throughout this document.

Figure 2:
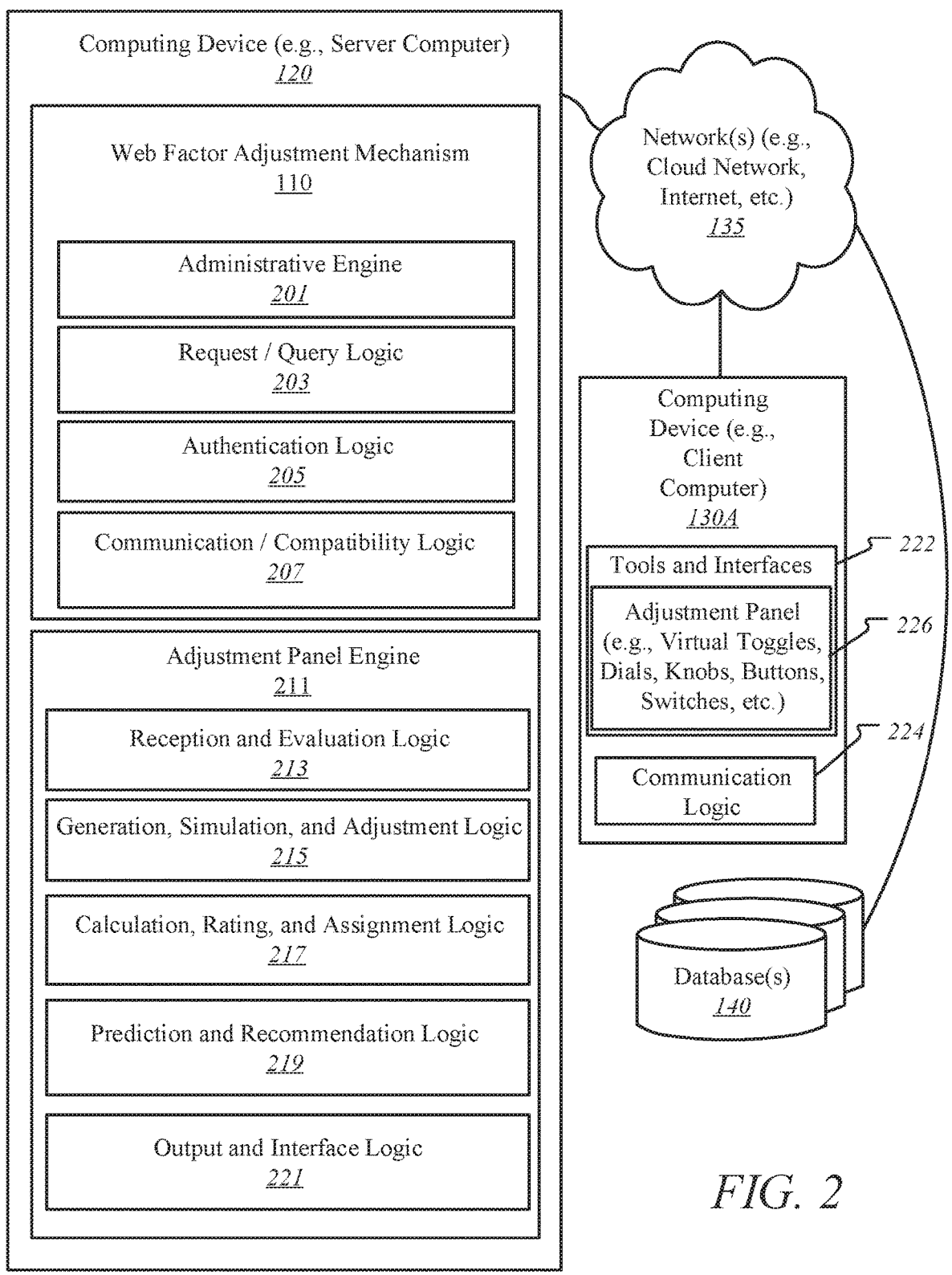
FIG. 2 illustrates a web factor adjustment mechanism according to one embodiment.

FIG. 2 illustrates web factor adjustment mechanism 110 of FIG. 1 according to one embodiment. In one embodiment, web factor adjustment mechanism 110 provides for facilitating moderation and/or validation of descriptions relating to products associated with tenants in multi-tenant database systems, where web factor adjustment mechanism 110 includes any number and type of components, such as administration engine 201 having (without limitation): request/query logic 203; authentication logic 205; and communication/compatibility logic 207. Similarly, web factor adjustment mechanism 110 may further include adjustment panel engine 211 including (without limitations): reception and evaluation logic 213; generation, simulation, and adjustment logic 215; calculation, rating, and assignment logic 217; prediction and recommendation logic 219; and output and interface logic 221.

In one embodiment, computing device 120 may serve as a service provider core (e.g., Salesforce.com® core) for hosting and maintaining web factor adjustment mechanism 110 and be in communication with one or more database(s) 140, client computer 130A, over one or more network(s) 135, and any number and type of dedicated nodes. In one embodiment, one or more database(s) 140 may be used to host, hold, or store data including interface details, API documentation, tool information, menus, objects, tables, code samples, HTTP client data, messages, queries, tenant and organization data, etc.

As will be further described in this document, server computing device serving as media-extracted metadata-based software configuration device ("media-based software configuration device") 120 is shown in communication with client computing device 130A over one or more network(s) 135 (e.g., cloud network, Internet, etc.). In one embodiment, client devices, such as client device 130A, allow for a user to place queries, access information, etc., using one or more user interfaces as facilitated by tools and interfaces 222, where the user interface may serve as a layer above and associated with API(s) provided by a service provider (e.g., Salesforce.com®). As illustrated, client device 130A is shown as employing tools and interfaces 222, and communication logic 224.

Throughout this document, terms like "framework", "mechanism", "engine", "logic", "component", "module", "tool", "builder", "circuit", and "circuitry", may be referenced interchangeably and include, by way of example, software, hardware, firmware, or any combination thereof.

Further, any use of a particular brand, word, or term, such as "query", "data", "images", "videos", "product", "description", "detail", "identifying", "detecting", "generating", "adjusting", "evaluating", "analyzing", "rating", "assigning", "recommending", "running", "toggle", "knob", "dial", "entry panel", "access panel", "adjustment panel", "facilitating", "threshold", "sales cloud", "code", "metadata", "business software", "application", "database servers", "metadata mapping", "database", "gathering", "generating", "merging", "associating", "calculating", "computing", "determining", "classifying", "application programming interface", "API", "user interface", etc., should not be read to limit embodiments to software or devices that carry that label in products or in literature external to this document.

As aforementioned, with respect to FIG. 1, any number and type of requests and/or queries may be received at or submitted to request/query logic 203 for processing. For example, incoming requests may specify which services from computing device 120 are to be provided, such as query requests, search request, status requests, database transactions, graphical user interface requests and interactions, processing requests to retrieve, update, or store data, etc., on behalf of client device 130A, code execution requests, and so forth.

In one embodiment, computing device 120 may implement request/query logic 203 to serve as a request/query interface via a web server or as a stand-alone interface to receive requests packets or other requests from the client device 130A. The request interface may further support the return of response packets or other replies and responses in an outgoing direction from computing device 120 to one or more client device 130A.

Similarly, request/query logic 203 may serve as a query interface to provide additional functionalities to pass queries from, for example, a web service into the multi-tenant database system for execution against database(s) 140 and retrieval of customer data and stored records without the involvement of the multi-tenant database system or for processing search queries via the multi-tenant database system, as well as for the retrieval and processing of data maintained by other available data stores of the host organization's production environment. Further, authentication logic 205 may operate on behalf of the host organization, via computing device 120, to verify, authenticate, and authorize, user credentials associated with users attempting to gain access to the host organization via one or more client device 130A.

In one embodiment, computing device 120 may include a server computer which may be further in communication with one or more databases or storage repositories, such as database(s) 140, which may be located locally or remotely over one or more networks, such as network(s) 235 (e.g., cloud network, Internet, proximity network, intranet, Internet of Things ("IoT"), Cloud of Things ("CoT"), etc.). Computing device 120 is further shown to be in communication with any number and type of other computing devices, such as client device 130A, over one or more communication mediums, such as network(s) 140.

Conventional techniques do not provide for automatic or intelligent ways for performance analysis of web products. Such conventional techniques are limited in that the provide for web performance analysis at the last stage in a web development process and therefore such analysis lack value and significance. Further, such analysis require full end-to-end runs in dealing with various controlled parameters, such as network, data shape, JavaScript processing, etc., which is time-consuming and causes delays. For example, for new features, scrum teams may be spending months developing features without knowing their performance implications until it is too late. For example, for existing features, such as for pages with complex composition, scrum teams may need to speed hours analysis data and guess what changes may provide necessary performance improvement. Such processes may be unrepeatable and require extensive knowledge in various domains (e.g., backend development, frontend development, backend performance, frontend performance, scalability, data analysis, etc.).

Embodiments provide for a novel technique that allows engineers and scrum teams a quick "risk-free" way to explore universal virtual toggles to adjust any number and type of factors that are capable of impacting web performances. Some of these universal virtual toggles may be used to adjust one or more of network latency, data size, server processing, octane score, etc. For example, when a user (e.g., engineer, software developer, database administrator, etc.) may adjust a toggle to facilitate a simulation to compute the latest performance metrics and generate an updated waterfall along with key metrics.

This novel technique offers users (e.g., developers, engineers, administrators, etc.) a quick risk-free manner in which to explore those performance factors that may impact performance of web products, where some of these performance factors include one or more of network latency, data size, server processing, user interface, octane score, etc. Further, data types with associated metadata may be regarded as another capability to select from to take into consideration the specific limitations of different devices (e.g., screen-widths, processing threads, browser/rendering limitations, like parallel Extensible Markup Language (XML) Hypertext Transfer Protocol (HTTP) requests (XHRs), etc.).

For example, when a user adjusts a toggle and selects a device type, this novel technique offers a simulation having virtual toggles to compute latest performance metrics and generate an updated waterfall along with an indication of key metrics. Then, in one embodiment, this novel technique offers actionable insights on what or why something needs to be improved to get certain optimization levels in performance and how these actions may improve the overall performance of a web product, such as a website. Further, this novel technique allows simulation of conditions of performance impacting toggles in "n" different ways over "n" separate iterations over time with minimal effort.

As facilitated by web factor adjustment mechanism 110, embodiments provide for a novel technique for simulating performance factors associated with web products, such as websites, for offering automated and dynamic web performance analysis of the web products. Embodiments provide for a novel technique for automating web performance analysis by offering adjustment of certain factors through simply adjusting virtual toggles associated with such factors. This offers a quick/risk-free solution to development teams to explore toggles for known universal factors that can impact web performance. Some of these universal factors include network latency, data size, server processing, and octane score, etc.

Embodiments further provide for a novel technique for facilitating extending performance simulation to any platform using metadata. As facilitated by web factor adjustment mechanism 110, embodiments provide for a novel technique for predicting which actions to take, such as a which performance factors to adjust, based on metadata and one or more structures or platforms. Embodiments offer prediction of which actions to take, such as a which performance factors to adjust, based on metadata and one or more structures or platforms, such as mobile devices, televisions, desktop computers, etc., are to be used to broadcast content through web products, such as a website, mobile application, etc.

For example, this novel technique allows for extending its functionalities beyond modern browser. Although hardware have become more powerful and accommodating in recent years, a user (e.g., developer) who needs to deliver content to multiple delivery platforms may still need to decide the most ideal architecture to deliver a high performance user experience. These platforms may include one or more of mobile device, television, dashboard console, desktop computer, etc.

Without a tool to quickly gauge user experience prior to development, scrum teams are required to validate each step to ensure they are going down the right path, which is time-consuming, error-prone, and inefficient.

In one embodiment, developers may publish a platform using metadata to describe the platform's behavior, such as a maximum number of concurrent requests (e.g., HTTP requests, multi-threading availability, etc.), where this platform may be loaded to view the projected user experience for the selected platform. In one embodiment, the user may adjust an individual toggle, indicator length, and indicator orders to view the various configurations to determine an ideal architecture to deliver contents through the desired platform. For example, reception and evaluation logic 213 may be triggered to receive and identify any metadata indicating the platform and/or architectural structure and describing key performance factors for the selected platform, such as Boolean (on/off) or adjustable type. This metadata and the platform/structure may further describe user experience flow, such as describing two actions that are related to each other (e.g., {javascript: 20, server: 30}, {javascript: 40, server: 50, javascript: 40}, etc.). For example, generation, simulation, and adjustable logic 215 and output and interface logic 221 may provide and generate and display a toggle that is backed by adjustable key performance factors for any platform selected by the user, and offer and display a waterfall result associated with each platform with an ability to adjust the corresponding toggle at a global level (e.g., with shared user experience segments) and individual platform levels.

Embodiments further provide for a novel technique for facilitating performance simulation with cost factors and multi-iterations supports. As facilitated by web factor adjustment mechanism 110, embodiments provide for a novel technique for evaluating historical statistics associated with performance factors associated with web products. Embodiments further provide for rating the performance factors based on the historical statistics and assigning cost-benefit elements to the performance factors for adjustments through virtual toggles. Embodiments offer evaluation of historical statistics associated with performance factors associated with web products. Embodiments further provide for rating the performance factors based on the historical statistics and assigning cost-benefit elements to the performance factors for adjustments through virtual toggles.

It is contemplated that certain items may hinder a developer's efforts to find an optimal solution to the way the conventional techniques work. For example, a developer may need in-depth knowledge and understanding of architecture to derive effective improvement; however, not every developer working on a project may have this level or depth of knowledge and understanding. Further, any manual interactions are inefficient and error-prone.

In one embodiment, calculation, rating, and assignment logic 217 may be triggered to compute a cost factor associated with each toggle associated with a performance factor. This cost factor may represent the effort or resources, a developer may need to apply for a change to a real web product. For example, {JAVASCRIPT: {5: [−10 . . . 10], 20: [−30 . . . −10], 30: [10 . . . 40] } }, where this data structure represents the cause of improvement or regression 10% of JAVASCRIPT costs 5 units; improvement 10 to 40% of JAVASCRIPT costs 30 units.

Further, for example, cost factor may involve reviewing of historical statistics relating to performance factors and their levels of impact on improving performance of a web product along with any losses or costs that are expected to be incurred with adjustment of such performance factors. For example, a performance factor (e.g., server processing), when adjusted up or down, may improve web product performance; however, such an adjustment may result in certain losses or costs, such as financial costs, loss or waste of resources, etc.

In one embodiment, generation, simulation, and adjustment logic 215 may be used to facilitate running of multiple simulations with toggles and cost factors in a short period of time, and simulate and run all pertinent permutations and/or combinations to determine the best end page time having a smallest cost factor. For example, output and interface logic 221 may provide and display N top simulation along with descriptive analysis with what metrics or parameters have changed in each simulation.

Embodiments further provide for a novel technique for preparation and communication of recommendations based on actional insights of issues to optimize performance of an application. As facilitated by web factor adjustment mechanism 110, embodiments provide for a novel technique for automatically and dynamically running simulation of adjustments to performance factors to enhance performance of web products. Embodiments further provide for recommending certain adjustments at certain levels to certain performance factors to enhance the web product performance. Embodiments further provide for recommending certain adjustments at certain levels to certain performance factors to enhance the web product performance.

With conventional techniques, although certain limitations of or issues with the system may be apparent, but it is complex and very difficult to prioritize and fix such limitations and issues. Further, as web products (e.g., web applications, websites, etc.) are getting increasingly complex, there are also increasing number of components, functions, features, etc., needing improvement and/or fixing.

In one embodiment, upon calculation of performance factors and how much adjustment to them is feasible and favorable as facilitated by calculation, rating, and assignment logic 217, actionable insights may be identified and prepared by prediction and recommendation logic 219, where these actionable insights may then be offered and communicated to the user as facilitated by output and interface logic 221. These recommendations may enhance the developer's decision by showing and sharing any number of top actional insights that are favorable with respect to improved performance/optimization and acceptable regarding any cost-benefit analysis.

Further, for example, these actionable insights may describe what type of optimization it is and what is to be done to achieve that optimization. For example, {Optimization Type: DB, Specific Type: Query, Current Cost: 500 ms}, {Optimization Type: API Performance, Specific Type: Java Run Time, CPUTime, Current Cost: 1 sec, 200 ms}, {Optimization Type: US, Specific Type: ComponentName, Current Cost: 200 ms}, etc. Further, in one embodiment, these recommendations, based on actionable insights, may be displayed to the user in addition the waterfall results to further enhance the user's understanding of the waterfall chart to optimize in priority order.

As aforesaid, conventional techniques for adjustment of any factors to improve web product performance is complex and cumbersome and often not feasible since such analysis and determinations are made too late, typically at the last stage.

This novel technique, as facilitated by web factor adjustment mechanism 110 and further facilitated by adjustment panel engine 211, allows for evaluation of web products (e.g., website) and certain factors associated with such web products at an early stage so that any necessary or desirable adjustments may be made to one or more of the factors to facilitate increased efficiency and improved performance of one or more of the web products.

Continuing with the example, adjustment panel 226 may be offered at client device 130A as facilitated by output and interface logic 221, such that adjustment panel 226 may offer any number and type of virtual toggles corresponding to any number and type of factors such that a toggle may be adjusted to then adjust a corresponding factor to improve the website. Stated differently, these virtual toggles offer an easy and early manner for a user to adjust performance factors associated with a web product to achieve the right sort of balance in maximizing the web product performance.

It is contemplated and noted that adjustment panel 226 is not limited to virtual toggles of any shape or form. For example, toggles may be round and dial-like or simply a collection of virtual buttons or virtual switches, etc., and that embodiments are not limited as such. For the sake of brevity, clarity, and ease of understanding, "virtual toggles" (or simply "toggles") are described throughout this document, but that embodiments are not limited as such and that virtual "buttons", virtual "switches", etc., may be used synonymously and interchangeably with "toggles" throughout this document. Similarly, terms like "adjustment panel", "control panel", "control switch panel", etc., are also used synonymously and interchangeably throughout this document.

Similarly, embodiments are not limited to any number of types of "performance factors" (or simply "factors") associated with web products that are adjusted through toggles to improve performance of such web products. For example, factors may include network latency, data size, server processing, user interface, octane score, processing/BPT, JavaScript, and/or the like, and that for brevity, clarify, and ease of understanding, one or more factors may be discussed and repeated throughout this document, but that embodiments are not limited as such. Further, embodiments are not limited to web products, nor are the web products limited to websites, but that embodiments may be applied to worked with web applications, mobile applications, personal websites, business websites, social media websites, etc.

In one embodiment, as facilitated by reception and evaluation logic 213, a web product (e.g., website) may be identified for improvement and any metadata (e.g., page information associated with the website) may be received. This metadata may be used to determine one or more factors (e.g., network latency, data size, server processing, user interface, octane score, etc.) that may be adjusted to impact, such improve, the web product performance. In one embodiment, generation, simulation, and adjustment logic 215 may be used to generate one or more virtual toggles corresponding to the one or more factors to allow the user to make any adjustment necessary and desirable to reach a balance of adjustments to achieve maximum performance for the web product.

For example, as facilitated by generation, simulation, and adjustment logic 215, the user may use one or more virtual toggles to adjust, in real-time, the one or more factors to determine what type or level of impact such adjustments would have on the web product. For example, when a user adjusts a toggle and selects a device type (e.g., screen-width, central processing unit (CPU) threads, browser and/or rendering limitations, etc.), the simulation, as facilitated by generation, simulation, and adjustment logic 215 computes, in real-time, the latest performance metrics and goes on to generate an updated waterfall along with the key metrics. For example, once a desirable balance is achieved with respect to latest performance metrics, the user may choose to set the toggles and allow the web product to achieve maximum results.

Further, these adjustments are made dynamically and there, in some embodiments, the user may continue to watch the performance and adjust one or more toggles to continue to change the performance metrics to stay with the desired balance and maintain the web product performance. In some embodiments, new toggles may be generated, while any existing toggles not needed may be removed from adjustment panel 226 as facilitated by generation, simulation, and adjustment logic 215. This novel technique allows for scrum teams, developers, engineers, administrators, etc., to have and access a quick risk-free way of virtual toggles to explore any factors that are universally known or particularly considered to impact web products, such as network latency, data size, server processing, user interface, octane score, etc.

In one embodiment, as facilitated by calculation, rating, and assignment logic 217 and prediction and recommendation logic 219, actionable insights are on "what" or "why" some performance metric or factor needs improving to get to a certain level of optimization in the overall performance of certain web products. In some embodiment, prediction and recommendation logic 219 may be used to predict or offer these actionable insights then be used to generate corresponding toggles that may then be used by users to adjust the performance metrics based on the actionable insights, as facilitated by generation, simulation, and adjustment logic 215.

Further, in one embodiment, any data/metadata (e.g., page information) associated with a web product may be received and then evaluated, as facilitated by reception and evaluation logic 213, with respect to one or more platforms to be used to deliver contents of the web product. For example, any contents of the web product may be delivered through a website using one or more delivery platforms, such as mobile devices, desktops, televisions, etc. In one embodiment, these delivery platforms are also analyzed or evaluated, as facilitated by reception and evaluation logic 213, to determine the best and most optimized manner to deliver the contents, such as how to maximize web product performance should contents be delivered through an application using a mobile device or broadcast using television networks.

Once the performance maximizing scheme is determined, generation, simulation, and adjustment logic 215 facilitate generation of toggles corresponding to factors or performance metrics to be adjusted based on the scheme, where the toggles are then adjusted to achieve the optimized performance for the web product when delivering through one or more analyzed delivery platforms.

Further, in one embodiment, historical statistics associated with which and how factors can impact performance of a web product are identified and evaluated as facilitated by reception and evaluation logic 213. For example, how networks metrics, server metrics, etc., may have historically impacted performance and delivery of contents of a website over last several deliveries or attempts may be gathered as historical statistics and evaluated. As facilitated by prediction and recommendation logic 219, any evaluation results may then be used to put together actionable insights that may be used as predictions and recommendations to know and adjust one or more factors/performance metrics to obtain maximum performance for a web product.

Further, in one embodiment, cost-benefit analysis of various performance metrics may be computed based on the historical statistics, as facilitated by calculation, rating, and assignment logic 217. For example, historical statistics may be considered to determine a level of benefit that may be achieved versus the amount of cost that may be sustained with respect to each factor or metric adjustment associated with a web product. Once the cost-benefit computation is performed, a cost-benefit consideration tag may be assigned to each factor, as facilitated by calculation, rating, and assignment logic 217, so that the user may know whether or how much to adjust a factor, such as without sustaining too much cost, etc., as facilitated by generation, simulation, and adjustment logic 215.

In one embodiment, generation, simulation, and adjustment logic 215 may be used to facilitate simulation of changes or adjustments to one or more factors associated with a web product. In one embodiment, prediction and recommendation logic 219 facilitates offering of factor and adjustment recommendations based on the simulation, where such recommendations may list specific factors, levels of adjustment, etc., to improve performance of the web product.

As mentioned previously, it is contemplated that queries may include any number and type of requests seeking responses for processing jobs, running reports, seeking data, etc. These queries are typically placed by users on behalf of tenants, using client device 130A. It is contemplated that a tenant may include an organization of any size or type, such as a business, a company, a corporation, a government agency, a philanthropic or non-profit entity, an educational institution, etc., having single or multiple departments (e.g., accounting, marketing, legal, etc.), single or multiple layers of authority (e.g., C-level positions, directors, managers, receptionists, etc.), single or multiple types of businesses or sub-organizations (e.g., sodas, snacks, restaurants, sponsorships, charitable foundation, services, skills, time etc.) and/or the like Communication/compatibility logic 207 may facilitate the ability to dynamically communicate and stay configured with any number and type of software/application developing tools, models, data processing servers, database platforms and architectures, programming languages and their corresponding platforms, etc., while ensuring compatibility with changing technologies, parameters, protocols, standards, etc.

It is contemplated that any number and type of components may be added to and/or removed from web factor adjustment mechanism 110 to facilitate various embodiments including adding, removing, and/or enhancing certain features. It is contemplated that embodiments are not limited to any technology, topology, system, architecture, and/or standard and are dynamic enough to adopt and adapt to any future changes.

Figure 3A:
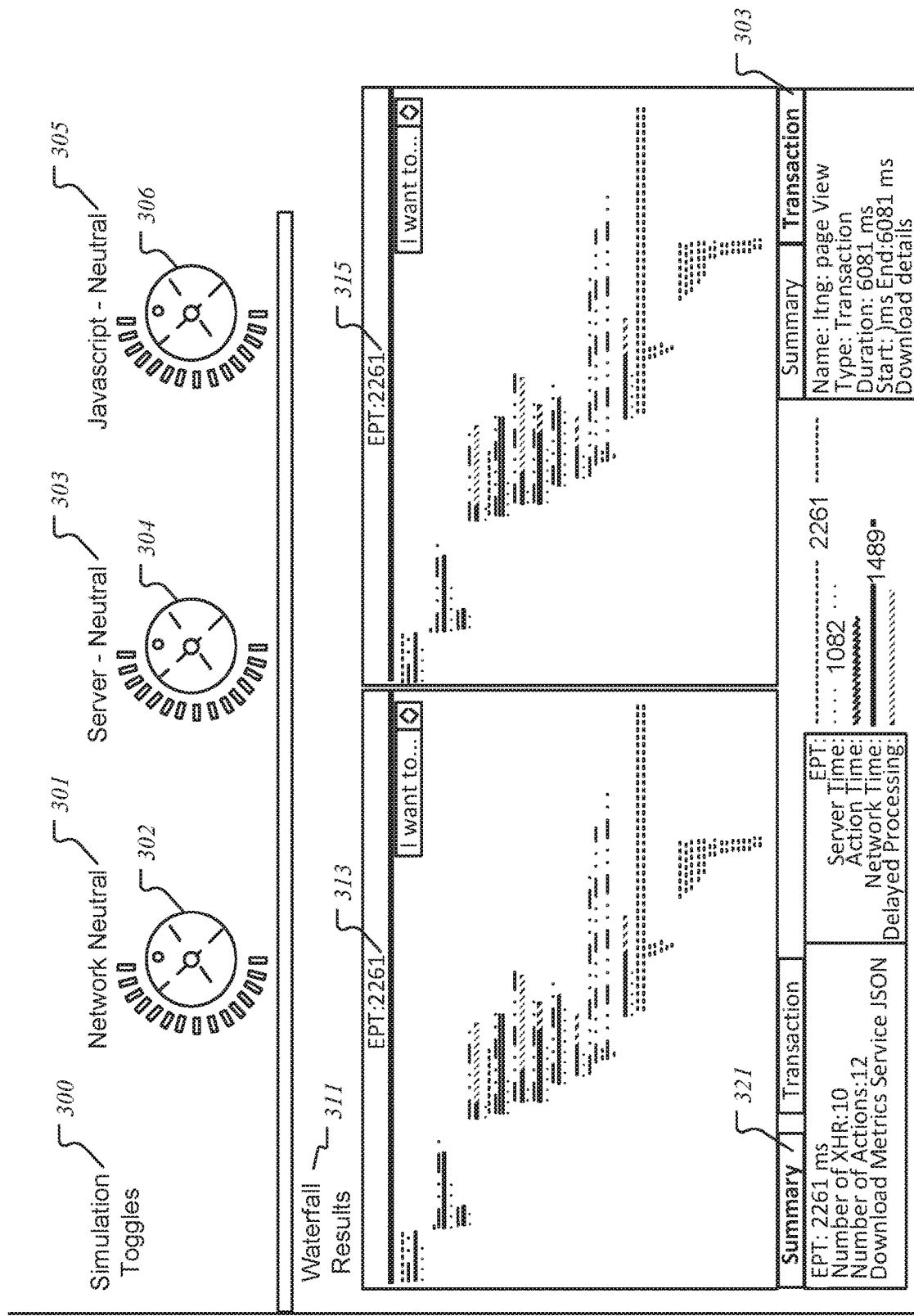
FIGS. 3A-3B illustrate simulation toggles and waterfall results according to one embodiment.

FIG. 3A illustrates simulation virtual toggles 300 and waterfall results 311 according to one embodiment. For brevity, clarity, and ease of understanding, many of the components and processes described with respect to FIGS. 1-2 may not be repeated or discussed hereafter.

In the illustrated embodiment, simulation virtual toggles 300 are shown for three performance factors associated with a website, where the performance factors include network 301, server 303, and JavaScript 305. As illustrated, three virtual toggles 302, 304, 306 (such as in the shape of dials or knobs) are associated with the three performance factors of network 301, server 303, and JavaScript 305, respectively, as facilitated by outcome and interface logic 221 of FIG. 2. As discussed about with reference to FIG. 2, as one or more toggles 302, 304, 306 are adjusted, any metrics associated with the corresponding factors of network 301, server 303, and JavaScript 305 are also adjusted and consequently, any variations with respect to the corresponding performance metrics associated with one or more of network 301, server 303, and JavaScript 305 are shown in waterfall results 311, as facilitated by outcome and interface logic 221 of FIG. 2.

For example, as illustrated, two portions 313, 315 of waterfall results 311 are shown, where first portion 313 shows summary 321 of the outcome, while second portion 315 shows transactions 323. In one embodiment, both summary 321 and transactions 323 are changed dynamically and in real-time corresponding to any live and real-time adjustments resulting from movement of one or more of toggles 302, 304, 306.

As aforesaid with respect to FIG. 2, toggles 302, 304, 306 may be generated in based on a web product's schema including page information associated with the web product, such as a website, where the page information may include information relating to names, markers, etc., associated with the web product as follows:

Page Information

| Field Name | Description |
|---|---|
| Name | Name |
| Markers | Collection of Marker sorted by StartTime |
| Description | Description of this particular page |
| Tags | Information Tag for Searching, Index, etc. |
| Device Types | List of supported Device Types for this page |

Examples

| Name | Markers | Description | Tags | Device Types |
|---|---|---|---|---|
| Product 1 Home | Start time | Home Page for Product 1 | Version 20, Standard User | Web, WebView |
| Product 1 Home | Duration | Home Page for Product 1 with Extra | Version 20, Sales Extra User | Web |

As illustrated, name may offer a short description of a website page, while markers may refer to a collection of markers sorted by start-time. For example, a marker and its examples are illustrated below:

Marker

| Field Name | Description |
|---|---|
| Name | Short Description that appears in the waterfall |
| Start | Start time using millisecond as unit |
| Duration | Duration in milliseconds |
| Type | Toggle Type (only Range Type is supported) |
| SpecificType | Create Component, JS Init, JSON Serialization, JSON Serialization, Server API Call, Rendering time, Client & Server data transport |
| Cost Factor | List of Cost Factors. Represent the resources cost to improve duration of this marker |

Examples

| Name | Start | Duration | Type |
|---|---|---|---|
| PlatformStateManagerController.getTabByNameAndApp | 0 | 123 | JavaScript |
| PlatformStateManagerController.getTabByNameAndApp | 1 | 121 | Network |
| PlatformStateManagerController.getTabByNameAndApp | 1 | 89 | Server |
| FlexipageControllerV2.getPage | 163 | 438 | JavaScript |
| FlexipageControllerV2.getPage | 163 | 396 | Network |
| FlexipageControllerV2.getPage | 163 | 282 | Server |

Figure 3B:
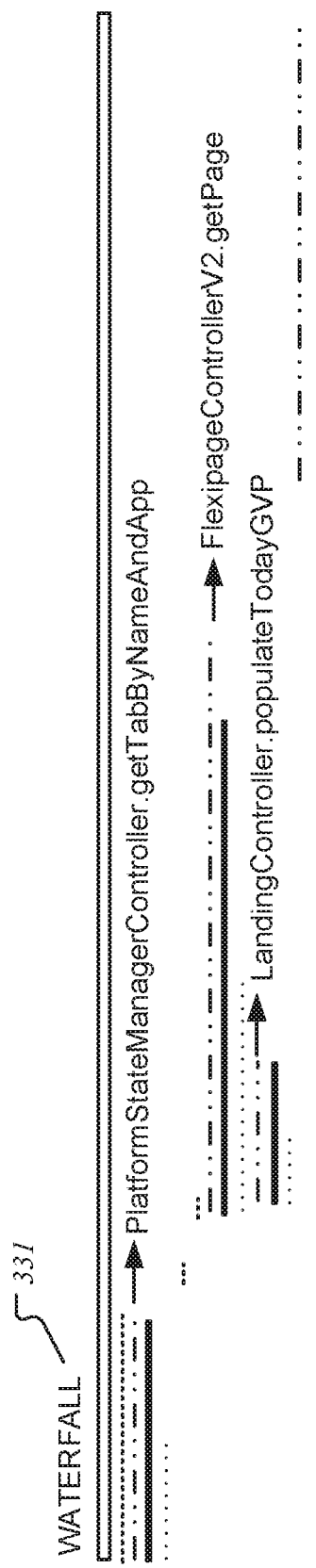

FIG. 3B illustrates waterfall section 331 of waterfall results 311 of FIG. 3A according to one embodiment. For brevity, clarity, and ease of understanding, many of the components and processes described with respect to FIGS. 1-3A may not be repeated or discussed hereafter.

As discussed, this waterfall section 351 of waterfall results 311 of FIG. 3A may be outputted, as facilitated by output and interface logic 221 of FIG. 2, based on changes in performance metrics in response to changes in one or more performance factors of network 301, server 303, and JavaScript 305 by simply adjusting corresponding one or more of virtual toggles 302, 304, 306 of FIG. 3A, as facilitated by generation, simulation, and adjustment logic 215 of FIG. 2.

For example, as illustrated below, description of toggles 302, 304, 306 may indicate the type of performance factors of network 301, server 303, and JavaScript 305 and their adjustment/importance values with respect to the web product as computed and assigned by calculation, rating, and assignment logic 217. The following is a toggle and its pertinent examples:

Toggle

| Field Name | Description |
|---|---|
| Name | Name |
| Type | Toggle Type: Range, Boolean, Concurrency |
| Description | Description |
| Value | Various based on type |

Examples

```
{
    "Javascript": {
        Type: Range,
        Description: "Represents Javascript Processing Speed"
    },
    "Network": {
        Type: Range,
        Description: "Represents Javascript Processing Speed"
    },
    "Server": {
        Type: Range,
        Description: "Represents Network Speed"
    },
    "WebWorker": {
        Type: Boolean,
        Description: "Represents if Webworker is used"
    },
    "Parallel Request Limit" : {
        Type: Concurrency,
        Value: 6,
        Description: "Represents concurrency request limit"
    }
}
```

In one embodiment, each value assigned to a performance factor may be computed based on how adjustment to a certain performance factor may change the metrics values associated with the performance factor and, in turn, impact the performance of the web product. For example, could adjustment to metrics associated with server 303 may impact a website's performance more than adjusting any metrics associated with network 301 or JavaScript 305, etc. As illustrated below, for example, network 301 is assigned a value of 0, server 303 is assigned a value of 0.5, while JavaScript 305 is assigned a value of 0.3.

Values

| Type | Value |
|---|---|
| JavaScript | 0.3 |
| Network | 0 |
| Server | 0.5 |

Similarly, another example of a toggle is as follows:

Toggle

| Field Name | Description |
|---|---|
| Name | Name |
| Type | Toggle Type: Range, Boolean |
| Description | Description |

Examples

| Name | Type | Description |
|---|---|---|
| Processing | Range | Represents Javascript Processing Speed |
| Network | Range | Represents Network Speed |
| Server | Range | Represents Server Speed |
| WebWorker | Boolean | Represents whether Webworker is used |

Similarly, device schema, cost factor, insight schema, and their examples, as discussed throughout this document, may appear as follows:

Device Schema

| Field Name | Description |
|---|---|
| Name | Short description of what this device depicts |
| Toggles | List of toggles associated with this particular device |

Examples

```
{
    "Web": {
        Toggles: [WebWorker, Javascript, Network, Server]
    }
}
```

Cost Factor

| Field Name | Description |
|---|---|
| Name | Short description of this cost factor |
| Type | Represent the type of resource associated with this cost factor |
| CostFactor | Represent a collection of cost (Key: unit, Value: percentage of improvement) |

Examples

```
{
    CostFactors: [{
        Name: "Javascript-Optimization",
        Type: "Hardware",
        CostFactor: {
            5: {min: 10, max: 30},
            10: {min: -30, max: 10}
        }
    }]
{
```

Insight Schema

| Field Name | DataType | Description |
|---|---|---|
| Name | String | Short description of what this InsightType depicts |
| InsightType | String | Name of Insight Type like Javascript, Network, Server, CSS |
| SpecificType | String | Possible name of specific type of Insight type like JS object init, js rendering, js cache, server cpu, server db, CSS repaint, Network type and packet loss specifcs |
| CurrentDuration | Range | Current cost of this specific insight operation |
| IdealOptimizedDuration | Range | Ideal cost or most optimized cost this operation should incur |

Example

```
{
    Insights: [{
        Name: "Page layout initialization",
        InsightType: "Javascript",
        SpecificType: "JS object init",
        CurrentDuration: 200ms,
        IdealOptimizedDuration: 80ms
    }]
}
```

Figure 3C:
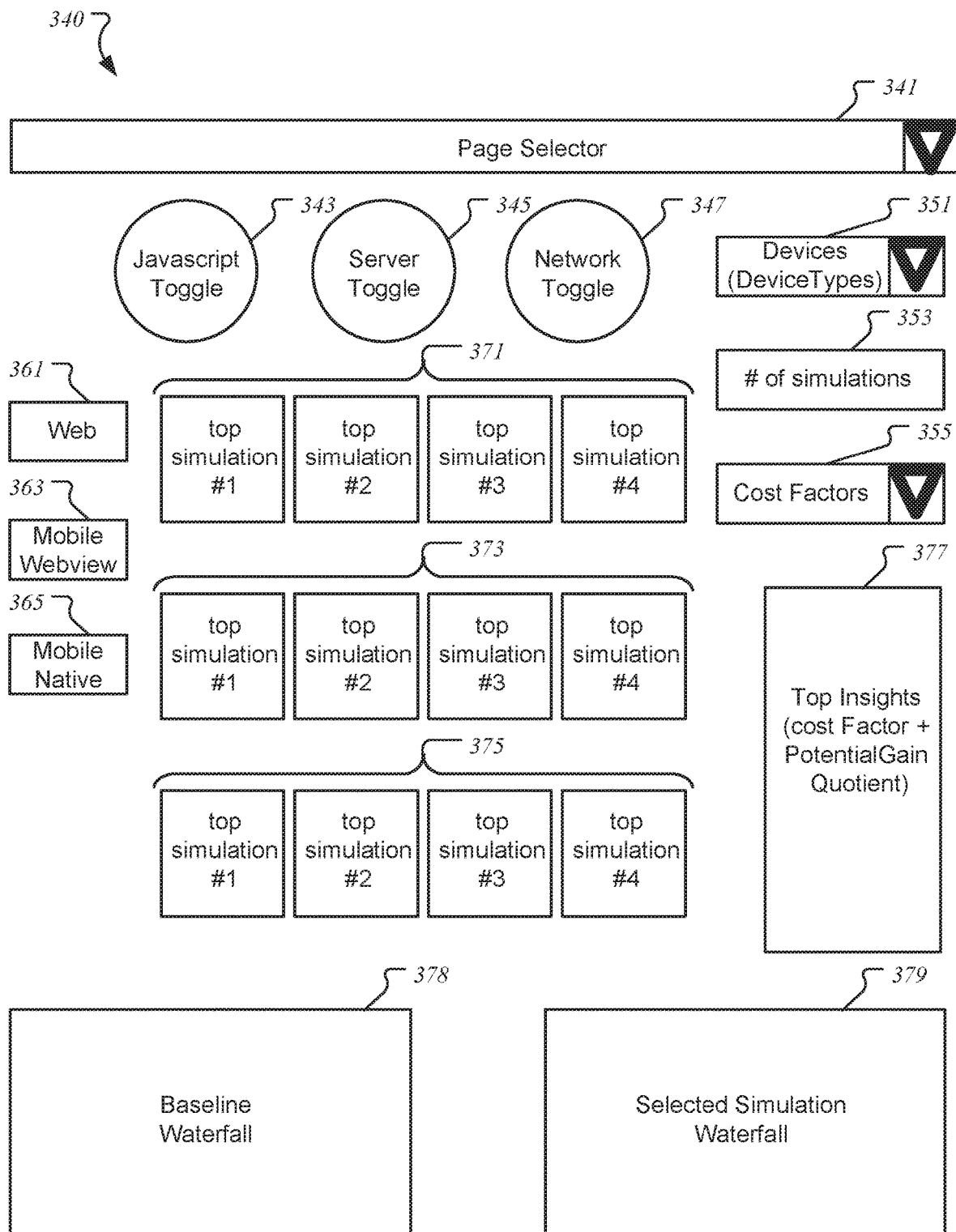
FIGS. 3C-3D illustrate wireframes according to one embodiment.

FIG. 3C illustrates a wireframe 340 illustrating a skeletal framework for employing certain components and processes according to one embodiment. Wireframe 360 may be facilitated by processing logic that may comprise hardware (e.g., circuitry, dedicated logic, programmable logic, etc.), software (such as instructions run on a processing device), or a combination thereof, as facilitated by one or more components of web factor adjustment mechanism 110 of FIG. 1. For brevity, clarity, and ease of understanding, many of the components and processes described with respect to FIGS. 1-3B may not be repeated or discussed hereafter.

As illustrated, wireframe 340 illustrates a dropdown menu for page selector 341 along with offering certain exemplary toggles including JavaScript toggle 343, server toggle 345, and network toggle 347. The illustrated embodiment of wireframe 340 further illustrates dropdown menu options for devices (or device types) 351, number of simulations 353, and cost factors 355 as further described with reference to FIG. 2.

The illustrated embodiment of wireframe 340 further offers simulations associated with various platforms, such as top simulations 1-4 371 associated with web 361, top simulations 1-4 373 associated with mobile web view 363, and top simulations 1-4 375 associated with mobile native 365. As further illustrated, the skeletal framework may also display top actionable insights 377 (e.g., cost factor+potential gain quotient) along with waterfall results, such as baseline waterfall 378 and selected simulation waterfall 379 based on simulations 371, 373, 375.

Figure 3D:
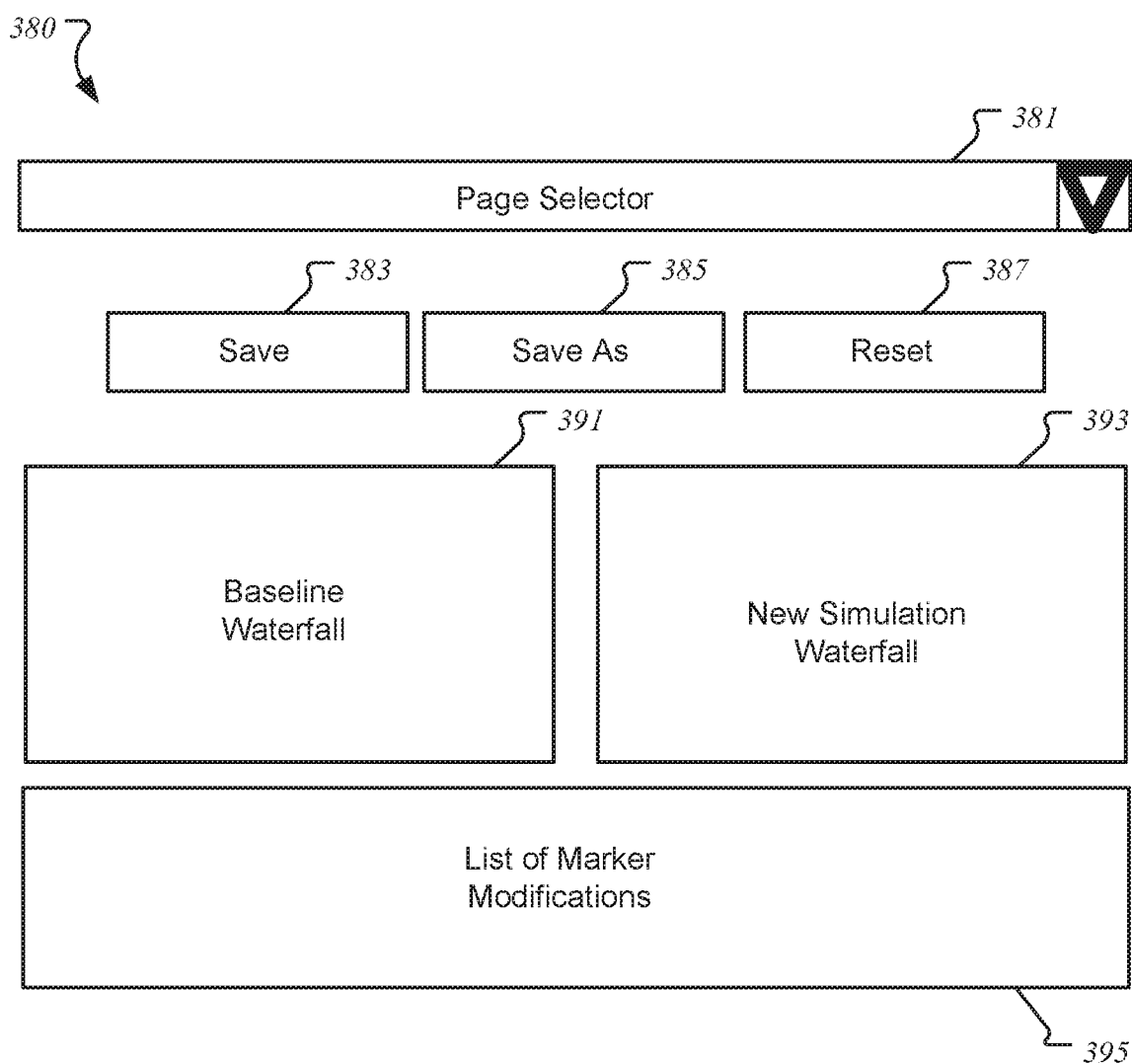

FIG. 3D illustrates a wireframe 380 illustrating a skeletal framework for employing certain components and processes according to one embodiment. Wireframe 380 may be facilitated by processing logic that may comprise hardware (e.g., circuitry, dedicated logic, programmable logic, etc.), software (such as instructions run on a processing device), or a combination thereof, as facilitated by one or more components of web factor adjustment mechanism 110 of FIG. 1. For brevity, clarity, and ease of understanding, many of the components and processes described with respect to FIGS. 1-3C may not be repeated or discussed hereafter.

In the illustrated embodiment of wireframe 380 a dropdown menu for page selector 381 along with certain saving and resetting options, such as save 383, save as 385, and rest 387. In one embodiment, wireframe 380 further offers waterfall results, such as baseline waterfall 391 and new simulation waterfall 383, and list of marker modifications 395 for adding, removing, and updating markers as discussed with reference to FIG. 2.

Figure 4A:
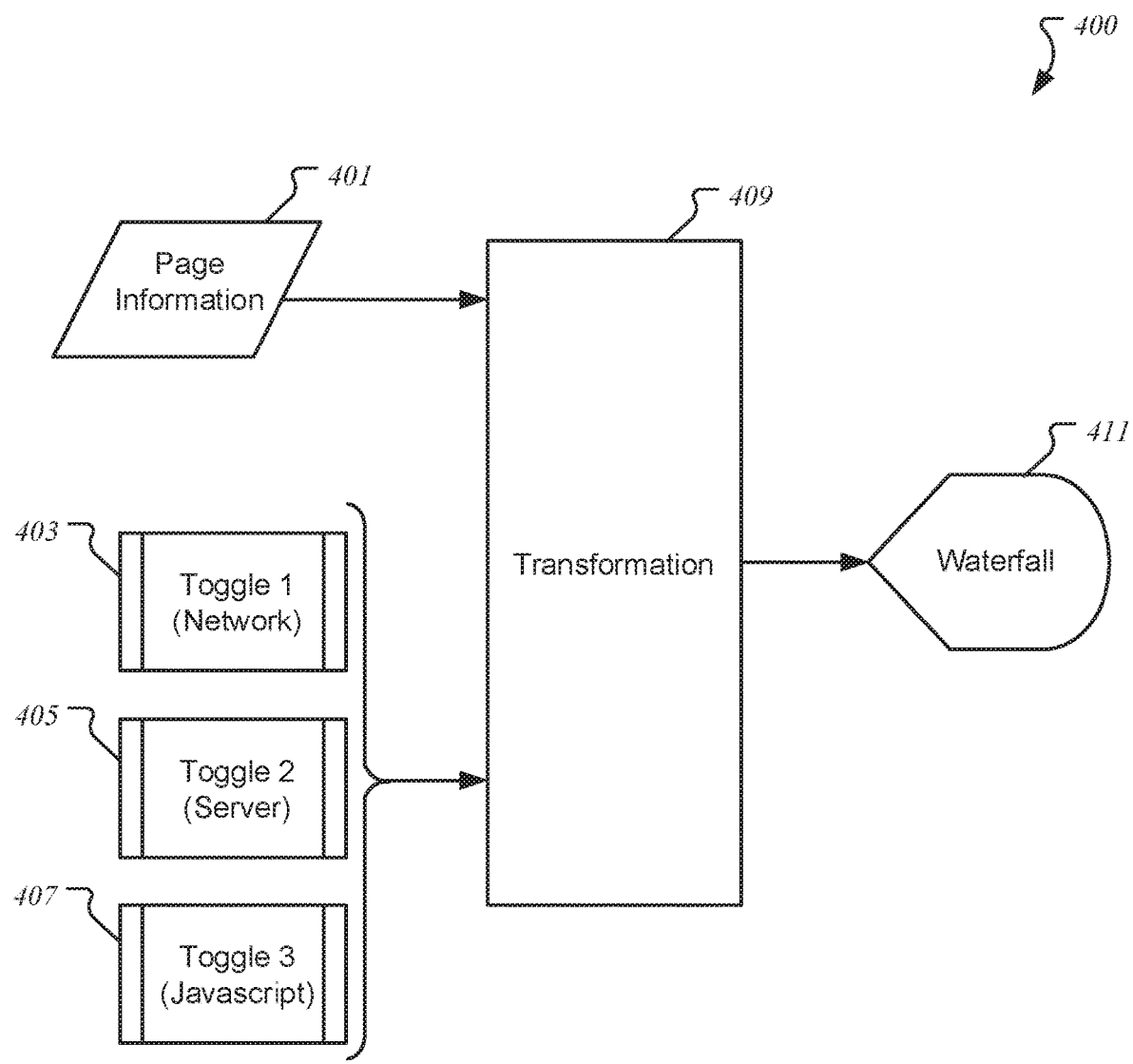
FIG. 4A illustrates a method for facilitating generation and use of toggles and output and communication of waterfall results according to one embodiment.

FIG. 4A illustrates a method 400 for facilitating dynamic adjustment of web product-based performance factors using toggles in database systems according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed or facilitated by one or more components of web factor adjustment mechanism 110 of FIG. 1. The processes of method 400 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-3D may not be repeated or discussed hereafter.

Method 400 starts at block 401 with reception and identification of page information (e.g., input parameters) relating to a web product (e.g., website, webpage, etc.). As discussed earlier with respect to FIG. 2, once the performance factors (e.g., network, server, JavaScript, etc.) to be adjusted are determined based on the page information and any other techniques (e.g., historical statistics, simulations, etc.), toggles corresponding to the performance factors are generated at blocks 403, 405, 407 and offered for adjustments through a user interface.

At block 409, page information and toggles (e.g., as multiplier factor) are put together through a transformation process so that any correspondence between the performance factors and the toggles may be established and the toggles may be allowed to be adjusted to alter any metrics associated with the performance factors. At block 411, waterfall resulting from adjustments made to metrics through adjustments to the toggles is generated and outputted as waterfall results.

Figure 4B:
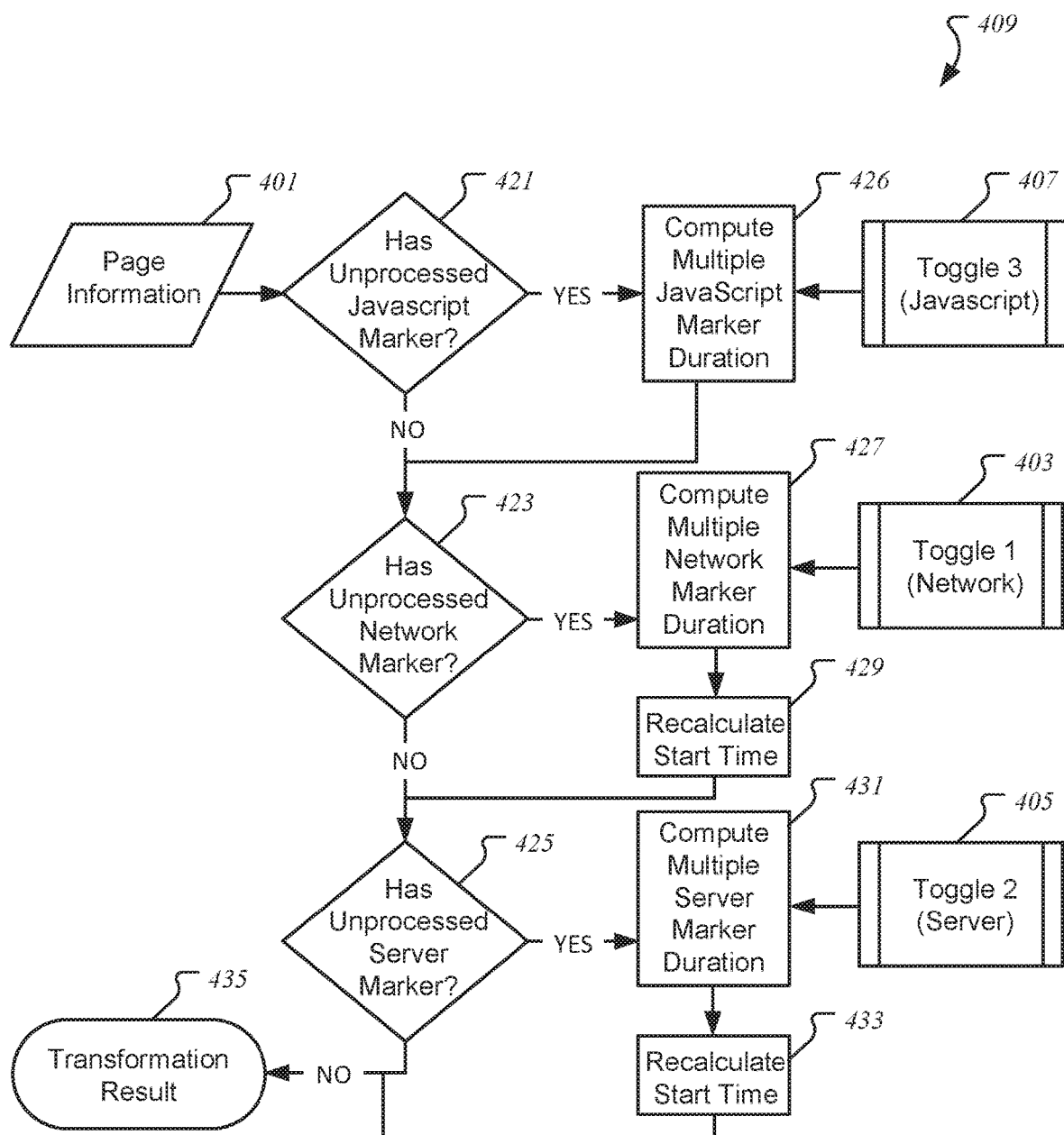
FIG. 4B illustrates a method for facilitating transformation according to one embodiment.

FIG. 4B illustrates a method 409 for facilitating transformation according to one embodiment. Method 409 may be performed by processing logic that may comprise hardware (e.g., circuitry, dedicated logic, programmable logic, etc.), software (such as instructions run on a processing device), or a combination thereof. In one embodiment, method 409 may be performed or facilitated by one or more components of web factor adjustment mechanism 110 of FIG. 1. The processes of method 409 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4A may not be repeated or discussed hereafter.

Method 409 refers to transformation as discussed with reference to FIG. 4A and starts at block 401 with reception of page information (e.g., input parameters) associated with a web product. At blocks 421, 423, and 425, determinations are made with respect to each of the performance factors, such as JavaScript, network, and server, respectively, as to whether there are any unprocessed markers. For example, referring to block 421, if there are no unprocessed JavaScript markers, then method 409 continues at block 423 and if there are no unprocessed network markers at block 423, then method 409 continues at block 425. If at block 425, it is further determined that there are not unprocessed server markers, then method 409 simply offers transformation results at block 435.

Now, in one embodiment, referring to block 421, if there is an unprocessed JavaScript marker, then at block 426, a multiple JavaScript marker duration is computed and a corresponding toggle 3 (JavaScript) is assigned to this performance factor at block 407, while method 409 continues at block 423. Similarly, in one embodiment, referring to block 423, if there is an unprocessed network marker, then at block 427, a multiple network marker duration is computed and a corresponding toggle 1 (network) is assigned to this performance factor at block 403 and a start time is recalculated at block 429, while method 409 continues at block 425.

In one embodiment, referring to block 425, if there is an unprocessed server marker, then at block 431, a multiple server marker duration is computed and a corresponding toggle 2 (server) is assigned to this performance factor at block 405 and a start time is recalculated at block 433, and transformation results are generated and offered at block 435.

In view of FIG. 4B, another example of toggles and their assigned values is shown below:

Toggles

| Type | Value |
|---|---|
| JavaScript | 1.3 |
| Network | 1 |
| Server | 1.5 |

Similarly, another example of page information is shown below, where this page information lists input parameters, such as name, start time, duration, and type of performance factor:

Page Information

| Name | Start | Duration | Type |
|---|---|---|---|
| PlatformStateManagerController.getTabByNameAndApp | 0 | 168.1 | JavaScript |
| PlatformStateManagerController.getTabByNameAndApp | 1 | 165.5 | Network |
| PlatformStateManagerController.getTabByNameAndApp | 1 | 133.5 | Server |
| FlexipageControllerV2.getPage | 203 | 591.6 | JavaScript |
| FlexipageControllerV2.getPage | 203 | 537 | Network |
| FlexipageControllerV2.getPage | 203 | 423 | Server |

Figure 4C:
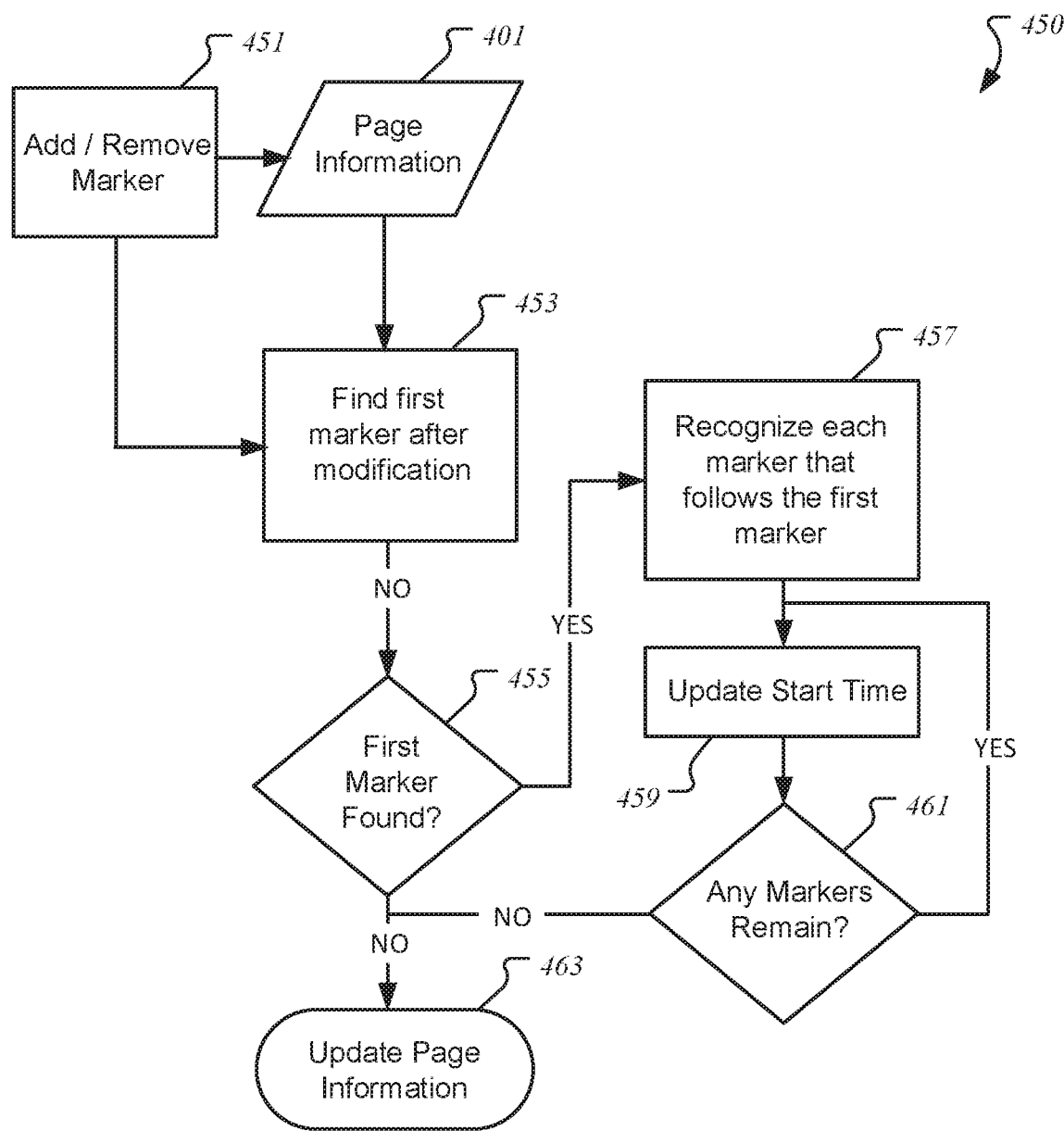
FIG. 4C illustrates a method for facilitating adding and/or removing of markers according to one embodiment.

FIG. 4C illustrates a method 450 for facilitating adding and/or removing of markers according to one embodiment. Method 450 may be performed by processing logic that may comprise hardware (e.g., circuitry, dedicated logic, programmable logic, etc.), software (such as instructions run on a processing device), or a combination thereof. In one embodiment, method 450 may be performed or facilitated by one or more components of web factor adjustment mechanism 110 of FIG. 1. The processes of method 450 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4B may not be repeated or discussed hereafter.

As illustrated, method 450 begins at block 401 with reception and identification of page information and introduction of adding/removing marker option at block 451. At block 453, using the page information and the adding/removing marker option, a first marker is sought after modification. At block 455, a determination is made as to whether the first marker is found. If the first marker is not found, method 450 ends at block 463 with updating of the page information with the additional information that no markers were found. If, referring to block 455, a first marker was found, then method 450 continues at block 457 with recognizing each marker thereafter that follows the first marker.

At block 459, a start time is updated. At block 461, another determination is made as to whether there are any markers left to be recognized. If not, method 450 end at block 463 with updating of the page information. If there are any additional markers left, as determined at block 461, then method 450 continues with updating of the start time at block 459.

Figure 4D:
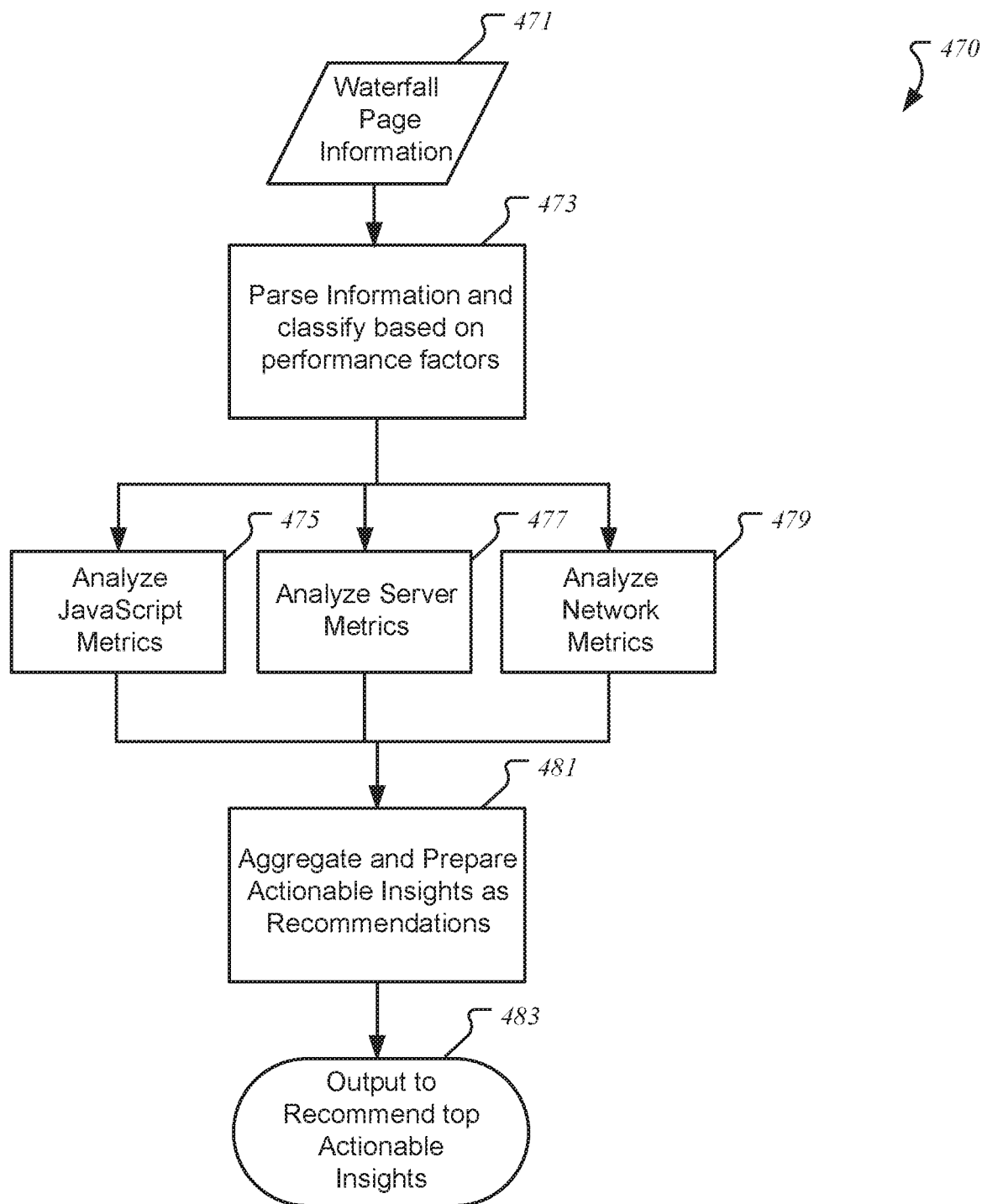
FIG. 4D illustrates a method for facilitating preparation and aggregation of actionable insights as recommendations according to one embodiment.

FIG. 4D illustrates a method 470 for facilitating preparation and recommendation of actionable insights according to one embodiment. Method 470 may be performed by processing logic that may comprise hardware (e.g., circuitry, dedicated logic, programmable logic, etc.), software (such as instructions run on a processing device), or a combination thereof. In one embodiment, method 470 may be performed or facilitated by one or more components of web factor adjustment mechanism 110 of FIG. 1. The processes of method 470 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4C may not be repeated or discussed hereafter.

As illustrated, in one embodiment, method 470 begins at block 471 with reception and identification of waterfall page information and that information is then parsed and categorized based on different performance factors at block 473. For example, these performance factors may include JavaScript, server (e.g., application programming interface (API) server), and network, where, any metrics relating to these performance factors, such as JavaScript metrics, sever metrics, network metrics are analyzed at blocks 475, 477, and 479, respectively. At block 481, these analyzed metrics are then used to generate and aggregate actionable insights. At block 483, these actionable insights are offered and outputted as recommendations, such as top three or five or ten actionable insights are offered/displayed, using a user interface and a display device, to the user as recommendations for performing web factor adjustments through corresponding toggles.

In view of FIG. 4B, the following are a few examples of JavaScript metrics analysis, such as:

Inputs for Parsing

| Name | Duration | Type | SpecificType |
|---|---|---|---|
| PlatformStateManagerController.getTabByNameAndApp | 80 ms | Javascript | Create & Init Component |
| PlatformStateManagerController.getTabByNameAndApp | 7 ms | Network | Data Transport from Client to Server |
| PlatformStateManagerController.getTabByNameAndApp | 200 ms | Network | Server API Call |
| PlatformStateManagerController.getTabByNameAndApp | 15 ms | Network | Data Transport from Server to Client |

Inputs for JavaScript Metrics Analysis from Parsing

Compute additional parameters based on the category of specifics. Rank and sort all different input of similar type, as follows:

| Name | Duration | Type | SpecificType |
|---|---|---|---|
| PlatformStateManagerController.getTabByNameAndApp | 30 ms | Javascript | JSON Serialization |
| PlatformStateManagerController.getTabByNameAndApp | 100 ms | Javascript | Rendering time |
| FlexipageControllerV2.getPage | 591 ms | Javascript | Javascript page init |

| Name | Duration | Type | SpecificType | PotentialGain Quotient |
|---|---|---|---|---|
| PlatformStateManagerController.getTabByNameAndApp | 80 ms | Javascript | Create & Init Component | 0.5 |
| PlatformStateManagerController.getTabByNameAndApp | 30 ms | Javascript | JSON Serialization | 0.16 |
| PlatformStateManagerController.getTabByNameAndApp | 100 ms | Javascript | Rendering time | 0.65 |
| FlexipageControllerV2.getPage | 591 ms | Javascript | Javascript page init | 0.8 |

Aggregation of Actionable Insights

Aggregating different insight types from different analysis results, as follows:

| Name | Duration | Type | SpecificType | PotentialGain Quotient |
|---|---|---|---|---|
| PlatformStateManagerController.getTabByNameAndApp | 80 ms | Javascript | Create Component | 0.5 |
| PlatformStateManagerController.getTabByNameAndApp | 7 ms | Network | Data Transport from Client to Server | 0.02 |
| PlatformStateManagerController.getTabByNameAndApp | 200 ms | Network | Server API Call | 1 |
| PlatformStateManagerController.getTabByNameAndApp | 15 ms | Network | Data Transport from Server to Client | 0.04 |
| PlatformStateManagerController.getTabByNameAndApp | 30 ms | Javascript | JSON Serialization | 0.16 |
| PlatformStateManagerController.getTabByNameAndApp | 100 ms | Javascript | Rendering time | 0.65 |
| FlexipageControllerV2.getPage | 591 ms | Javascript | Javascript page init | 0.8 |

Top Recommended Actionable Insights to the Use, Such as:

| Name | Duration | Type | SpecificType | PotentialGain Quotient |
|---|---|---|---|---|
| PlatformStateManagerController.getTabByNameAndApp | 200 ms | Network | Server API Call | 1 |
| FlexipageControllerV2.getPage | 591 ms | Javascript | Javascript page init | 0.8 |
| PlatformStateManagerController.getTabByNameAndApp | 100 ms | Javascript | Rendering time | 0.65 |
| PlatformStateManagerController.getTabByNameAndApp | 80 ms | Javascript | Create Component | 0.5 |
| PlatformStateManagerController.getTabByNameAndApp | 30 ms | Javascript | JSON Serialization | 0.16 |
| PlatformStateManagerController.getTabByNameAndApp | 15 ms | Network | Data Transport from Server to Client | 0.04 |
| PlatformStateManagerController.getTabByNameAndApp | 7 ms | Network | Data Transport from Client to Server | 0.02 |

Figure 4E:
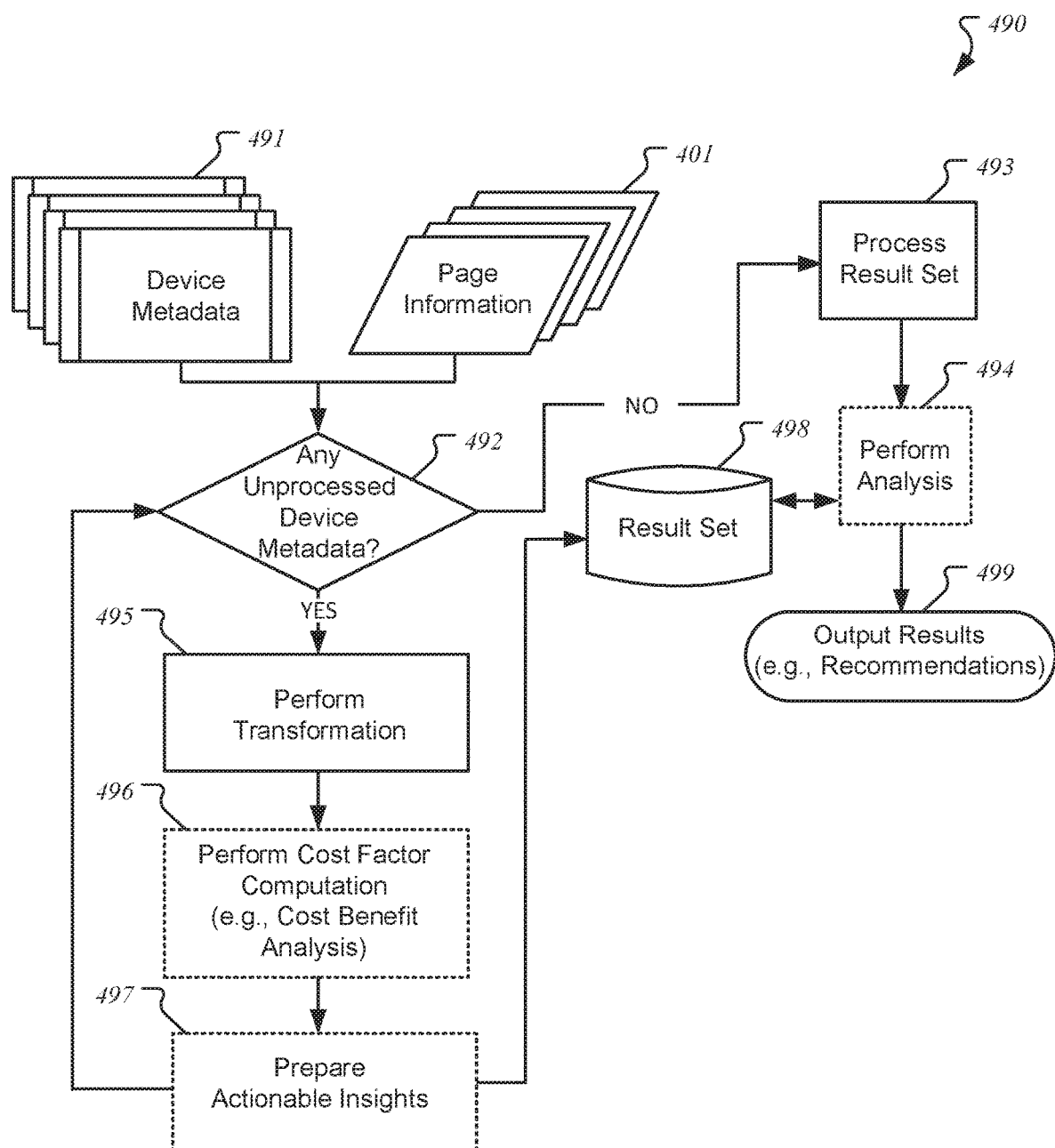
FIG. 4E illustrates a method for facilitating cost-benefit analysis and outputting recommendations according to one embodiment.

FIG. 4E illustrates a method 490 for facilitating improved web product performances based on device types and adjustment of pertinent performance factor according to one embodiment. Method 490 may be performed by processing logic that may comprise hardware (e.g., circuitry, dedicated logic, programmable logic, etc.), software (such as instructions run on a processing device), or a combination thereof. In one embodiment, method 490 may be performed or facilitated by one or more components of web factor adjustment mechanism 110 of FIG. 1. The processes of method 490 are illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-4D may not be repeated or discussed hereafter.

As illustrated, method 490 begins with reception and identification of page information 401 and device (type) metadata 491, where, at block 492, a decision is made as to whether there is any unprocessed device metadata. If not, method 490 continues with preparation of a process result set at block 493, where the result set is analyzed at block 494, and any recommendations are outputted and displayed at block 499.

In one embodiment, referring to block 492, if there is any unprocessed device metadata, then transformation, as illustrated with respect to FIGS. 4A-4B, of the unprocessed device metadata is performed at block 495. Method 490 then continues with cost factor computation at block 496, where this cost factor computation indicates a cost-benefit analysis for each performance factor and device type so that a balanced decision is reached in terms of both the cost and the benefit for each device and performance factor. At block 497, actionable insights are prepared and submitted for further analysis at block 494 through result set 498. At block 499, results having recommendations based on analysis of any actionable insights are offered and outputted.

Figure 5:
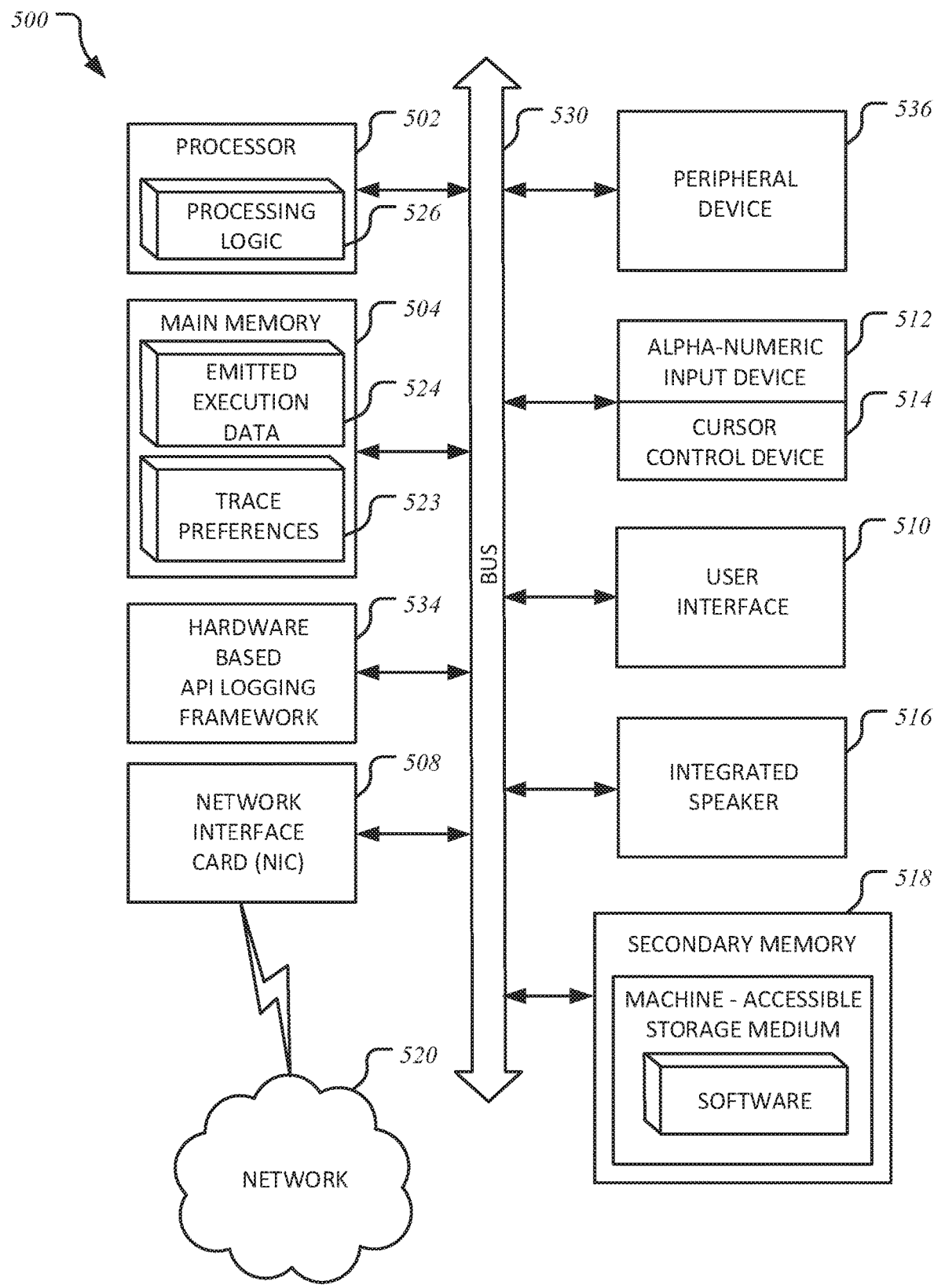
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing devices 120, 130A-N of FIG. 1. In alternative embodiments, the machine may be connected (e.g., networked) to other machines in a network (such as host machine 120 connected with client machines 130A-N over network(s) 135 of FIG. 1), such as a cloud-based network, Internet of Things (IoT) or Cloud of Things (CoT), a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of web factor adjustment mechanism 110 as described with reference to FIG. 1 and other Figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of web factor adjustment mechanism 110 as described with reference to FIG. 1, respectively, and other figures discussed herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
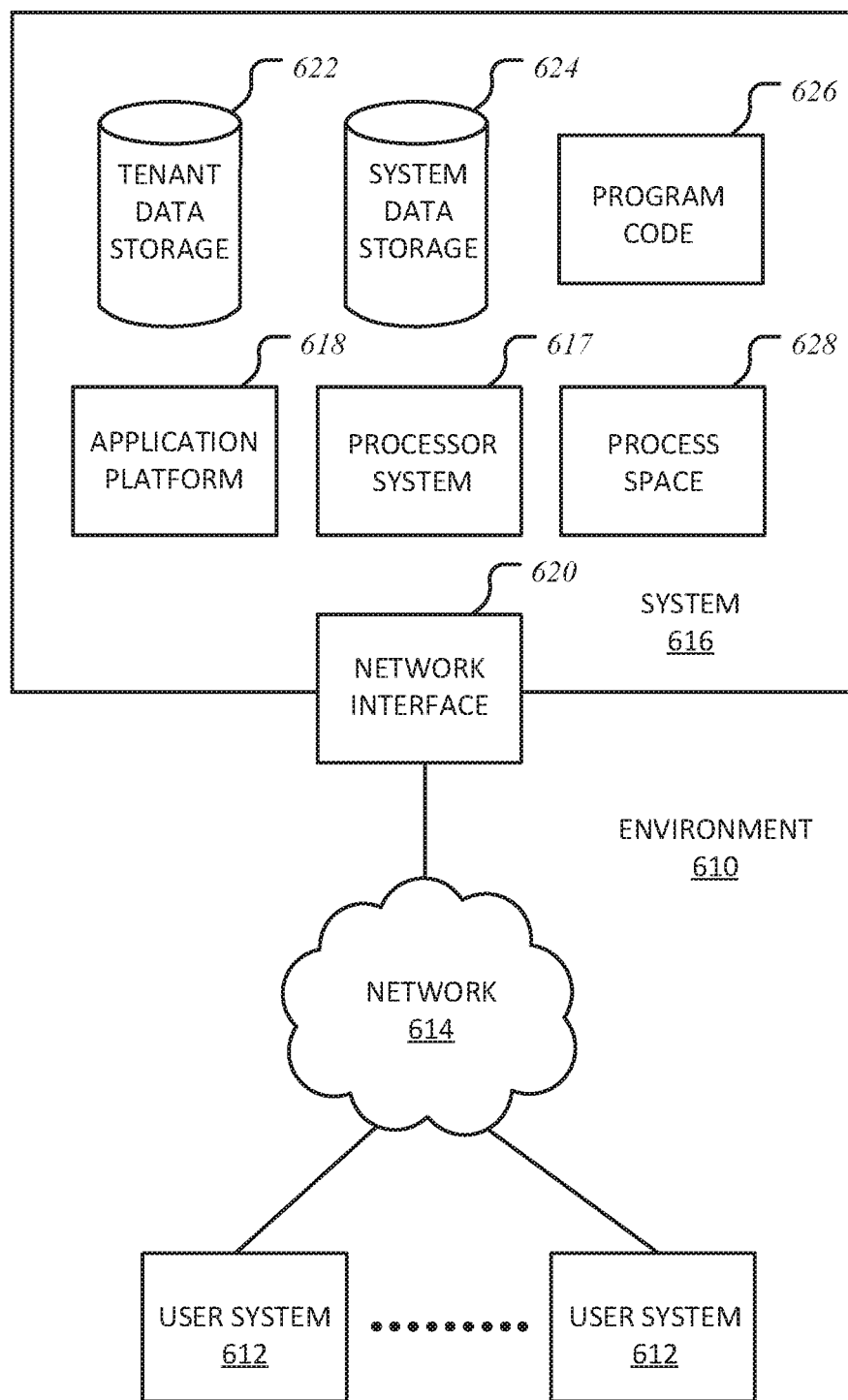
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a workstation, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third-party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load-sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third-party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database-indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
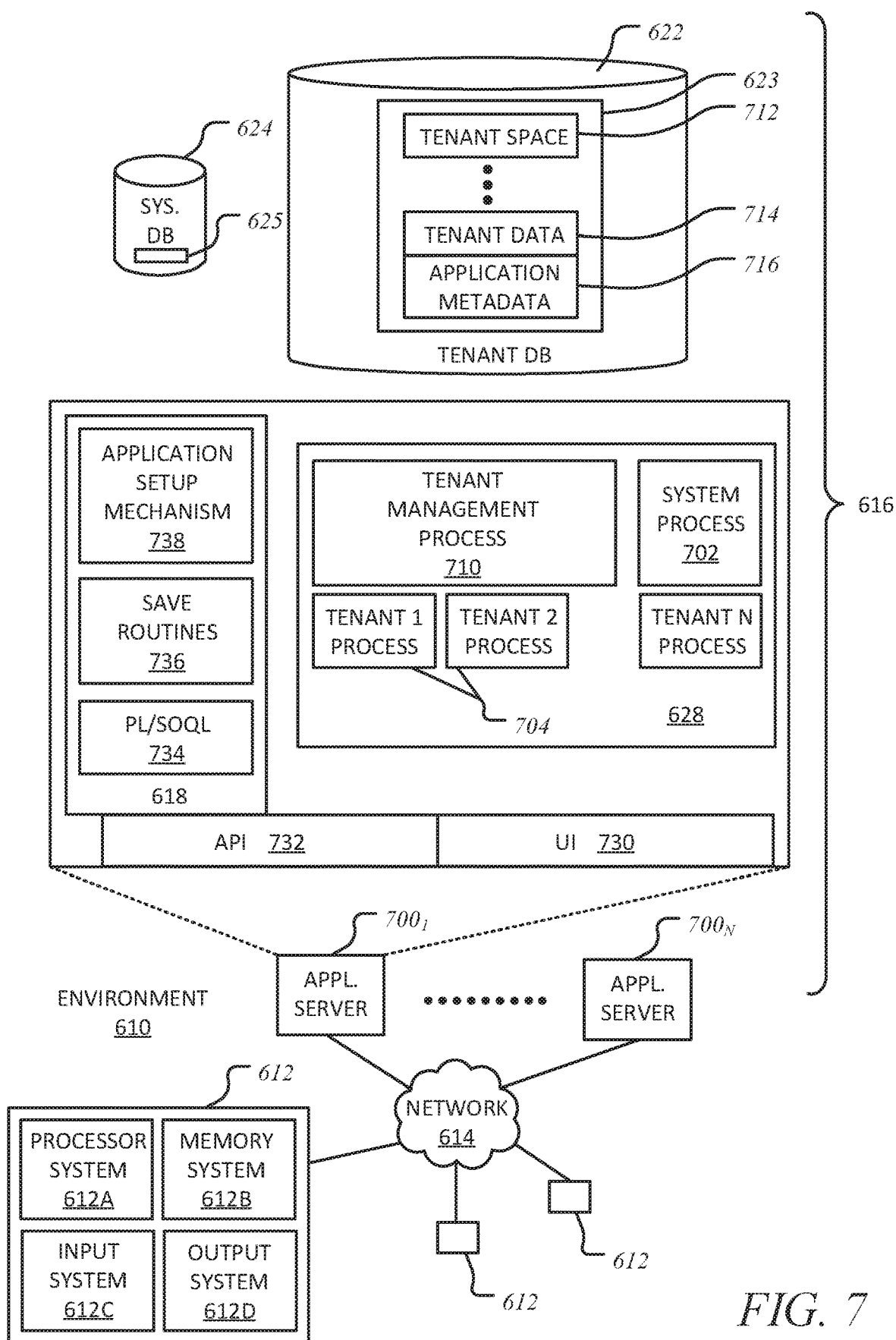
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items may be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method, comprising:
   analyzing statistics associated with performance of delivery of contents associated with a web product, wherein the contents are delivered using one or more delivery platforms and one or more device types over one or more networks;
   computing costs and benefits of adjusting one or more performance factors to enhance performance of the web product based on one or more metrics associated with the delivery platforms and the one or more device types;
   assigning one or more cost-benefit ratings, based on the costs and the benefits, to the one or more performance factors to indicate a cost and a benefit of adjusting each of the one or more performance factors;
   providing, based at least in part on the one or more cost-benefit ratings, one or more virtual setting buttons for display via a graphical user interface (GUI), the one or more virtual setting buttons being associated with the one or more performance factors; and
   facilitating one or more modifications to at least one performance factor of the one or more performance factors according to one or more adjustments to at least one virtual setting button of the one or more virtual setting buttons.

2. The method of claim 1, wherein the virtual setting buttons are provided via an adjustment panel.

3. The method of claim 1, wherein the one or more platforms comprise one or more of mobile devices, desktop devices, television sets, or dashboard consoles, wherein the one or more device types include one or more of screen-widths, central processing unit threads, or browsing/rendering limitations, and wherein the one or more performance factors include one or more of network latency, data sizes, data shapes, server processing, user interfaces, or octane scores, wherein the one or more metrics include one or more parameters associated with the one or more performance factors.

4. The method of claim 1, further comprising:
   prior to implementing the one or more modifications, simulating the one or more modifications to compute outcome of latest performance metrics associated with the web product based on the one or more modifications;
   generating waterfall results based on the outcome; and
   communicating the cost-benefit ratings and the waterfall results to the computing device.

5. The method of claim 1, further comprising implementing the one or more modifications to facilitate the enhanced performance associated with the web product, wherein the web product includes one or more of a web site, a webpage, or a web application communicated over one or more networks including a cloud network.

6. The method of claim 1, further comprising obtaining metadata comprising page information associated with the web product, wherein the metadata reveals the one or more performance factors, the one or more platforms, and or the one or more device types associated with the web product.

7. A system comprising:
a server computing device having a processing device and a storage device, the server computing device configurable to facilitate operations comprising:
analyzing statistics associated with performance of delivery of contents associated with a web product, wherein the contents are delivered using one or more delivery platforms and one or more device types over one or more networks;
computing costs and benefits of adjusting one or more performance factors to enhance performance of the web product based on one or more metrics associated with the delivery platforms and the one or more device types;
assigning one or more cost-benefit ratings, based on the costs and the benefits, to the one or more performance factors to indicate a cost and a benefit of adjusting each of the one or more performance factors;
providing, based at least in part on the one or more cost-benefit ratings, one or more virtual setting buttons for display via a graphical user interface (GUI), the one or more virtual setting buttons being associated with the one or more performance factors; and
facilitating one or more modifications to at least one performance factor of the one or more performance factors according to one or more adjustments to at least one virtual setting button of the one or more virtual setting buttons.

8. The database system of claim 7, wherein the one or more virtual setting buttons are provided via a virtual adjustment panel.

9. The system of claim 7, wherein the one or more platforms comprise one or more of mobile devices, desktop devices, television sets, or dashboard consoles, wherein the one or more device types include one or more of screen-widths, central processing unit threads, or browsing/rendering limitations, and wherein the one or more performance factors include one or more of network latency, data sizes, data shapes, server processing, user interfaces, or octane scores, wherein the one or more metrics include one or more parameters associated with the one or more performance factors.

10. The system of claim 7, wherein the operations further comprise:
prior to implementing the one or more modifications, simulating the one or more modifications to compute outcome of latest performance metrics associated with the web product based on the one or more modifications;
generating waterfall results based on the outcome; and
communicating the cost-benefit ratings and the waterfall results to the computing device.

11. The system of claim 7, wherein the operations further comprise implementing the one or more modifications to facilitate the enhanced performance associated with the web product, wherein the web product includes one or more of a website, a webpage, or a web application communicated over one or more networks including a cloud network.

12. The system of claim 7, wherein the operations further comprise obtaining metadata comprising page information associated with the web product, wherein the metadata reveals the one or more performance factors, the one or more platforms, and the one or more device types associated with the web product.

13. A non-transitory computer-readable medium comprising a plurality of instructions which, when executed by a computing device, cause the computing device to perform operations comprising:
analyzing statistics associated with performance of delivery of contents associated with a web product, wherein the contents are delivered using one or more delivery platforms and one or more device types over one or more networks;
computing costs and benefits of adjusting one or more performance factors to enhance performance of the web product based on one or more metrics associated with the delivery platforms and the one or more device types;
assigning one or more cost-benefit ratings, based on the costs and the benefits, to the one or more performance factors to indicate a cost and a benefit of adjusting each of the one or more performance factors;
providing, based at least in part on the one or more cost-benefit ratings, to one or more virtual setting buttons for display via a graphical user interface (GUI), the one or more virtual setting buttons being associated with the one or more performance factors; and
facilitating one or more modifications to at least one performance factor of the one or more performance factors according to one or more adjustments to at least one virtual setting button of the one or more virtual setting buttons.

14. The non-transitory computer-readable medium of claim 13, wherein the one or more virtual setting buttons are provided via a virtual adjustment panel.

15. The non-transitory computer-readable medium of claim 13, wherein the one or more platforms comprise one or more of mobile devices, desktop devices, television sets, or dashboard consoles, wherein the one or more device types include one or more of screen-widths, central processing unit threads, or browsing/rendering limitations, and wherein the one or more performance factors include one or more of network latency, data sizes, data shapes, server processing, user interfaces, or octane scores, wherein the one or more metrics include one or more parameters associated with the one or more performance factors.

16. The non-transitory computer-readable medium of claim 13, wherein the operations further comprise:
prior to implementing the one or more modifications, simulating the one or more modifications to compute outcome of latest performance metrics associated with the web product based on the one or more modifications;
generating waterfall results based on the outcome; and
communicating the cost-benefit ratings and the waterfall results to the computing device.

17. The non-transitory computer-readable medium of claim 13, wherein the operations further comprise implementing the one or more modifications to facilitate the enhanced performance associated with the web product, wherein the web product includes one or more of a website, a webpage, or a web application communicated over one or more networks including a cloud network.

18. The non-transitory computer-readable medium of claim 13, wherein the operations further comprise obtaining metadata comprising page information associated with the web product, wherein the metadata reveals the one or more performance factors, the one or more platforms, and the one or more device types associated with the web product.

* * * * *